United States Patent
Rojas-Cessa et al.

(10) Patent No.: US 11,016,516 B2
(45) Date of Patent: May 25, 2021

(54) ENERGY PACKET SWITCHES

(71) Applicant: New Jersey Institute of Technology, Newark, NJ (US)

(72) Inventors: Roberto Rojas-Cessa, Brooklyn, NY (US); Haim Grebel, Livingston, NJ (US); Zhengqi Jiang, Kearny, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 0 days.

(21) Appl. No.: 16/526,525

(22) Filed: Jul. 30, 2019

(65) Prior Publication Data
US 2020/0033903 A1 Jan. 30, 2020

Related U.S. Application Data

(60) Provisional application No. 62/711,746, filed on Jul. 30, 2018.

(51) Int. Cl.
*G05F 1/66* (2006.01)
*H02M 5/22* (2006.01)
(Continued)

(52) U.S. Cl.
CPC ............ *G05F 1/66* (2013.01); *H02M 1/08* (2013.01); *H02M 3/33507* (2013.01); *H02M 5/225* (2013.01)

(58) Field of Classification Search
CPC . G05F 1/66; H02J 1/102; H02J 1/109; H02M 1/08; H02M 3/33507; H02M 5/225
See application file for complete search history.

(56) References Cited

U.S. PATENT DOCUMENTS

| | | | | |
|---|---|---|---|---|
| 2009/0193268 A1* | 7/2009 | Kreiner | .............. | G06F 11/3062 713/300 |
| 2015/0142198 A1* | 5/2015 | Grebel | ..................... | H02J 3/46 700/295 |
| 2016/0049794 A1* | 2/2016 | Liu | ......................... | H02J 9/06 307/24 |

OTHER PUBLICATIONS

Abe, Rikiya , et al., "Digital Grid: Communicative Electrical Grids of the Future", IEEE Transactions on Smart Grid, vol. 2, No. 2, Jun. 2011, pp. 399-410.

(Continued)

*Primary Examiner* — Chad G Erdman
(74) *Attorney, Agent, or Firm* — Servilla Whitney LLC

(57) ABSTRACT

Energy packet switches (EPS) employing supercapacitors as storage provide aggregation and delivery of energy to users based on shared-capacitance in a digital power grid. The EPS aggregates energy from one or multiple energy sources, stores and dispatches the energy in discrete amounts as energy packets to one or multiple users. The payload of the energy packet is adjusted by the voltages of the supercapacitors which are used as energy containers for both the EPS and the users. The EPS has a control plane where data transmitted is used to control the operation of the EPS, and a power plane to receive and transmit energy between ports. The power and data planes work in parallel and with a parallel data network. Control and management of the EPS are based on a request-grant transport protocol. The data network is used to receive energy requests and grants, and a granting scheme is used to select which loads are granted energy. By sending addresses of granted loads on the data network and energy on the energy grid, energy is delivered to addressed destinations.

8 Claims, 21 Drawing Sheets

(51) Int. Cl.
*H02M 3/335* (2006.01)
*H02M 1/08* (2006.01)

(56) References Cited

OTHER PUBLICATIONS

Alizadeh, Mahnoosh, et al., "From Packet to Power Switchning: Digital Direct Load Scheduling", IEEE Journal on Selected Areas in Communications, vol. 30, No. 6, Jul. 2012, pp. 1027-1036.
Bouhafs, Faycal, et al., "Links to the Future", IEEE Power & Energy Magazine (2012), pp. 24-32.
Budka, Ken, et al., "GERI—Bell Labs Smart Grid Research Focus: Economic Modeling, Networking, and Security & Privacy", 2010 First IEEE International Conference on Smart Grid Communications, 6 pages.
Fan, Zhong, et al., "Smart Grid Communications: Overview of Research Challenges, Solutions, and Standardization Activities", IEEE Communications Surveys & Tutorials, vol. 15, No. 1, First Quarter 2013, pp. 21-38.
Galli, Stefano, et al., "For the Grid and Through the Grid:The Role of Power Line Communications in the Smart Grid", Proceedings of the IEEE, vol. 99, No. 6, Jun. 2011, pp. 998-1027.
Gono, Radomir, et al., "Reliability Analysis of Distribution Networks", 9th International Conference, Electrical Power Quality and Utilisation,Barcelona, Spain (2007), 5 pages.
He, Mike M., et al., "An Architecture for Local Energy Generation, Distribution, and Sharing", 2008 IEEE Energy2030 Conference, 6 pages.
He, Haibo, "Toward a Smart Grid: Integration of Computational Intelligence into Power Grid", The 2010 International Joint Conference on Neutral Networks (IJCNN), 6 pages.
Jiang, Zhengqi, et al., "Experimental Evaluation of Power Distribution to Reactive Loads in a Network-Controlled Delivery Grid", 2018 Third International Conference on Fog and Mobile Edge Computing (FMEC), 6 pages.
Liu, W-H Edwin, et al., "Consumer-Centric Smart Grid", ISGT 2011, 6 pages.
Lu, Gang, et al., "SmartGridLab: A Laboratory-Based Smart Grid Testbed", 2010 First IEEE International Conference on Smart Grid Communications, 6 pages.
Rojas-Cessa, Roberto, et al., "An Energy Packet Switch for Digital Power Grids", 2018 IEEE International Conference on Internet of Things (iThings) and IEEE Green Computing and Communications (GreenCom) and IEEE Cyber, Physical and Social Computing (CPSCom) and IEEE Smart Data (SmartData), 8 pages.
Rojas-Cessa, Roberto, et al., "Management of a Smart Grid with Controlled-Delivery of Discrete Levels of Energy", 2013 IEEE International Conference on Smart Grid Communications (SmartGridComm), 6 pages.
Rojas-Cessa, Roberto, et al., "Testbed Evaluations of a Controlled-Delivery Power Grid", 2014 IEEE International Conference on Smart Grid Communications (SmartGridComm), 6 pages.
Saitoh, Hiroumi, et al., "A New Concept of Electric Power Network for the Effective Transportation of Small Power of Dispersed Generation Plants", T.IEE Japan, vol. 115-B, No. 6, (1995), pp. 568-575.
Takuno, Tsuguhiro, et al., "In-home Power Distribution Systems by Circuit Switching and Power Packet Dispatching", 2010 First IEEE International Conference on Smart Grid Communications, pp. 427-430.
Xu, Yifei, et al., "Allocation of Discrete Energy on a Cloud-Computing Datacenter using a Digital Power Grid", 2012 IEEE International Conference on Green Computing and Communications, Conference on Internet of Things, and Conference on Cyber, Physical and Social Computing, 4 pages.
Yu, Wan-Yu, et al., "Coordinating a Society of Switch Agents for Power Distribution Service Restoration in a Smart Grid", 2011 16th International Conference on Intelligent System Applicatons to Power Systems, 7 pages.

\* cited by examiner

ENERGY PACKET SWITCHES

CROSS-REFERENCE TO RELATED APPLICATIONS

This non-provisional patent application claims the benefit of U.S. Provisional Patent Application No. 62/711,746 filed Jul. 30, 2018, the entirety of which is incorporated herein by reference.

STATEMENT REGARDING FEDERALLY SPONSORED RESEARCH

This invention was made with government support under Agreement No. 1641033 awarded by the National Science Foundation. The government has certain rights in the invention.

FIELD OF THE DISCLOSURE

The present disclosure relates to the field of energy delivery, transfer, and aggregation. In particular, the present disclosure relates to a shared-capacitance energy packet switch for digital grids.

BACKGROUND

Over the past decades, the North American power infrastructure has evolved into what many experts consider to be the largest and most complex system of the technological age. However, the vulnerability and potential problems of a power grid, a network for delivering electricity from suppliers to consumers, have placed the challenges of energy transmission and distribution into the limelight.

The existing power grid provides discretionary access to energy demands, keeping the grid perpetually energized. This uncontrolled accessibility requires generators to adapt the generation of power to the extent of consumption. Balancing the grid is such a careful and sensitive act that the incorporation of alternative energy sources with intermittent active times into the grid is complex and, in some cases, prohibitive. Moreover, the capacity of energy supply under discretionary access is determined by the physical infrastructure, allowing cases of over-demand, and when it occurs, overloaded distribution feeders ought to be taken out of the grid, generating blackouts. Close monitoring of the grid's performance may be achieved by deploying (auxiliary) sensing data networks. Concerns about ensuring working paths, yet perpetually energized, translate into additional management complexity. This illustrates the need for a controlled distribution of power, which may be seamlessly coupled with grid monitoring.

The general concept of a digital grid ("DG") involves transmitting energy through the grid as data is transmitted through the Internet. In the DG concept, elements of the grid (e.g., generators, distributors, buses, and loads interconnected through the Internet) are intended to play active roles in estimating and configuring the flow of electrical energy from generators to consuming loads. A usable DG should optimally provide the level of service of today's power grid plus the features needed to overcome its weaknesses. Some of these weaknesses include a need for a greater level of resiliency and direct integration of alternative energy sources.

SUMMARY

In a DG, energy is analogous to what data is to the Internet. Therefore, digitization of energy must be achieved for a DG to be realized. However, energy digitization is a concept complex to realize. One reason for that is the existing long tradition of using the grid passively, where energy is considered a flow, the behavior of which adheres to Kirkhoff's laws. Nevertheless, digital energy bits may be considered as discrete amounts of energy, or packets, also transmitted as a flow but in controllable amounts. The control of digital energy may be achieved in time and in amounts. In accordance with one or more embodiments, energy packets in the DG are delivered upon request only, as opposed to the current grid wherein energy is distributed in an analog fashion in which customers are self-entitled to consume discretionary amounts of energy at arbitrary times.

The approach used in the present disclosure is a controlled-delivery power grid (CDG). The CDG approach achieves a finer and more efficient balance between generation of electrical power and the demand of it with a feasible digitization of the power grid. In the CDG, users may issue requests for energy and the provider may fully or partially grant them within a period of time. As used herein the term "user" may refer to a household or entity that hosts one or multiple loads. The term "load" means and refers to any component of a circuit that consumes power or energy. In some cases, the terms may be synonymous. For example, a user hosting a single load may be referred to as a load. Each load requires electric energy to perform work. The use of requests and grants facilitates an estimation of total demand and gives the provider the ability to determine how and when to satisfy the requests. This management model also favors the adoption of a highly controlled power supply.

To forward energy packets from one transmission line onto another, the CDG needs an apparatus such as the presently disclosed energy packet switch. Recent efforts to define a power or energy switch have been centered on direct or alternating current controllers where paths are enabled by Internet addresses. However, the drawbacks of having a permanently energized grid and discretionary loads remain in these efforts, realizing at best partial digitization of the grid. Accordingly, embodiments disclosed herein provide energy packet switches capable of controlling energy delivered in discrete amounts to a load on a network-controlled power grid.

In one or more embodiments an energy packet switch (EPS) is disclosed that receives and supplies energy in discrete and addressable amounts. The EPS receives energy via an inlet port and issues energy via an outlet port. The combination of transmitting energy in finite and discrete amounts with an associated network address produces an energy packet. An energy packet is issued by the EPS after the execution of a request-grant protocol, where loads request amounts of energy needed to operate before energy is actually supplied. The energy packet is produced to ensure that a defined amount of energy is delivered to a load. Rather than limiting the amount of energy as it is being delivered, the embodiments of the EPS disclosed herein limit the total amount of energy to be delivered before transmission starts. The EPSs employ supercapacitors as energy containers to achieve this end. The supercapacitors shape energy packets, enable receiving energy from multiple and divergent sources without affecting stability of the distribution loop, and supply energy to one or multiple diverse loads. The combination of controlled energy supply through energy packets and the use of the request-grant protocol increase reliability and reliance of the grid under challenging environments.

In accordance with embodiments of the present disclosure, systems and methods are provided to create an energy packet and to transmit energy. In another embodiment, systems and methods are provided to aggregate multiple energy sources.

In one embodiment, an EPS is disclosed which is network controlled. That is, an energy packet is issued by the EPS after the execution of a request-grant protocol executed through a data network or through the power line (being used for data transmission as well), where loads or users request amounts of energy needed to operate before energy is actually supplied.

Systems and devices disclosed herein may include a processor operating to perform actions in response to executing computer program instructions, wherein the actions may include finding one or more available power sources, determining a suitable path to transmit energy and calculating the amount of energy granted to each user depending on a multitude of factors and objectives of the energy provider or the consumer of energy.

In one or more embodiments an EPS includes a central controller, at least one energy inlet, at least one energy outlet, a network interface, at least one supercapacitor and an interconnection fabric, wherein the interconnection fabric includes a plurality of network controllable switches, coupled to the at least one supercapacitor and the central controller. The network interface may be or include a power access point (PAP). The central controller is or includes a computing device operably coupled to the at least one supercapacitor and configured and operable to be coupled to a data network, the central controller including a non-transitory, computer readable storage medium containing a computer program, which when executed by a computer processor causes the computer processor to perform actions, the actions including receiving a request for energy from a user, the request including a destination address of the user, calculating an amount of energy to be delivered to the user in response to the request, and transmitting an energy packet comprising the calculated amount of energy to the destination address.

At least one of the plurality of network controllable switches may be or include a solid state relay (SSR). The EPS may include plural supercapacitors.

In still further embodiments systems are disclosed including at least one EPS as described herein, at least one energy source coupled to the EPS via the energy inlet, and at least one user, the user comprising at least one supercapacitor, at least one consuming load, at least one energy interface and at least one network interface, wherein the at least one user is operably coupled to the at least one EPS via the at least one network interface and the at least one energy interface, wherein the EPS communicates with the at least one user and at least one energy sources through a data network.

In yet still further embodiments disclosed are methods of delivering energy to a user in a system as described herein, the method including initializing voltages of the at least one EPS supercapacitor to Vs0 by the energy source, receiving at the EPS a request for energy from the at least one user supercapacitor, the request comprising an IP address and target voltage Vl of the at least one user supercapacitor, calculating at the EPS a number of supercapacitors, k, required to charge the at least one user supercapacitor, assigning a required number of supercapacitors k to the at least one user, determining whether there are k or more supercapacitors available in the EPS, and if so, assigning k supercapacitors to the at least one user in a next time slot in a queue, issuing an energy grant to the at least one user via the data network, and recharging by the energy source the k supercapacitors to a maximum voltage. The at least one user supercapacitor may send a request for energy to the EPS when the voltage of the at least one user supercapacitor is below a threshold tL.

The EPS may calculate the number of supercapacitors, k, required to charge the at least one user supercapacitor according to a preselected formula. Similarly, the EPS may calculate the amount of energy transferred between the EPS at least one supercapacitor and the at least one user supercapacitors according to a preselected formula.

In some embodiments, when the user includes plural supercapacitors, when the consuming load is consuming energy, one of the plural user supercapacitors supplies energy to the consuming load and another of the plural user supercapacitors recharges. The EPS may recharge the other of the plural supercapacitors according to a least frequency transfer policy wherein the other of the plural user supercapacitors issues a request for energy to the EPS when Vl<tL for an amount of energy that can be stored in a time slot. The amount of energy may depend on the duration of the time slot and the maximum permissible current.

In still other embodiments, the EPS recharges the other of the plural supercapacitors according to a top-off policy wherein the other of the plural user supercapacitors issues a request for energy to the EPS when voltage of the other of the plural user supercapacitors dips below a predefined value.

Thus, it is possible to connect a configurable supercapacitor at the EPS that is fully charged to the supercapacitor at the load that may have less energy stored than the EPS supercapacitor. By doing this, the energy from the EPS supercapacitor supplies energy to the load supercapacitor(s) in a controlled manner. The load supercapacitor cannot drain more energy than that contained in the EPS supercapacitor, in the worst-case scenario.

In a further embodiment, a method is provided for binding an amount of energy to be provided to a load independently of a rate of power consumption by the load, the method including providing at least two supercapacitors coupled to each other in a parallel mode, storing energy in at least one of the two supercapacitors, and transferring energy from a first of the at least two supercapacitors having a greater amount of energy than a second of the at least two supercapacitors to the second supercapacitor.

In yet still further embodiments, disclosed is a non-transitory, computer readable storage medium containing a computer program, which when executed by a computer processor causes the computer processor to perform actions, the actions including receiving a request for energy from a user, the request including a destination address of the user, calculating an amount of energy to be delivered to the user in response to the request, and transmitting an energy packet comprising the calculated amount of energy to the destination address.

Any combination and/or permutation of the embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed energy packet switch and associated systems and methods, reference is made to the accompanying figures, wherein.

DETAILED DESCRIPTION

Controlled Delivery Grid (CDG)

A major advantage of a digital microgrid (DMG) is the supply of discrete and finite amounts of energy, on demand, to loads. By adopting this approach, the DMG has several desirable advantages, such as minimizing or eliminating the difference between energy generation and supply, facilitating the power distribution amongst several segments of the microgrid, and increasing the stability of a power grid and providing intrinsic grid monitoring. In the DMG, to avoid exposing the power grid to discretionary consumption, energy delivery follows a request-grant protocol performed between energy sources and users, or loads. After a request from a user or load, an energy packet carrying the required amount of energy and the destination address of a specific customer is then supplied to the specific user who is the only one allowed to access the transmitted energy. Internet Protocol (IP) addresses may be used to realize this operation. In other words, each energy source and user, have an identification number or IP address. The addresses assigned to the users enable the energy ownership to specific users. In the CDG, the destination addresses are sent through a parallel data network.

Figure 1:
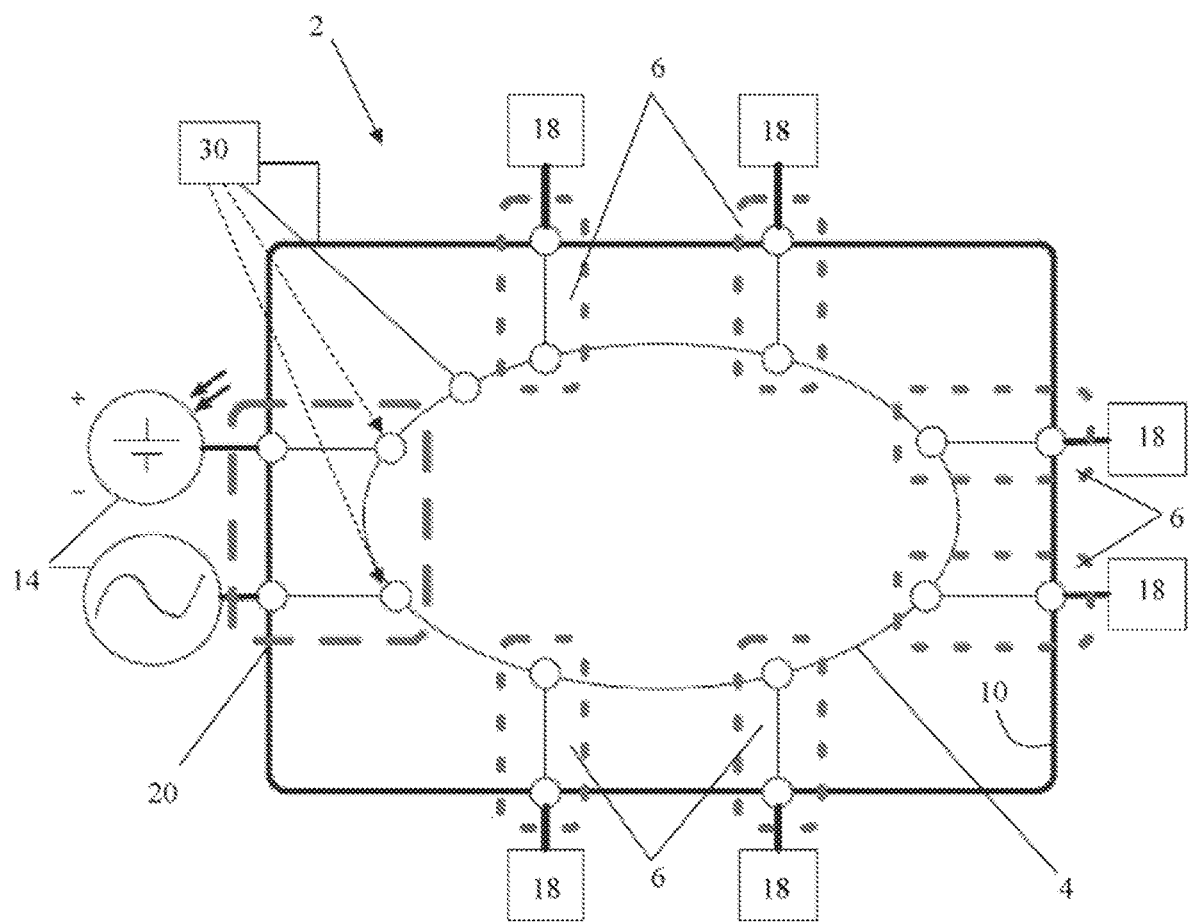
FIG. 1 is a schematic view of a controlled-delivery power grid using a parallel data network for controlling a power network in accordance with one or more embodiments disclosed herein.

With reference to FIG. 1, the CDG 2 uses a parallel data network 4 and power network 10 and includes power access points 6, and EPS 20 which is coupled to one or more energy sources 14. Data is exchanged between energy sources 14 and users 18 via the data network 4. Based on the exchanged data, a central controller 30 determines the supply of energy through the power network 10. The CDG controls the amount of energy supplied by using a capacitor capacitance to bind the amount of buffered energy. Time is slotted and energy is transmitted every time slot. The duration of a time slot is determined by the time it takes to supply the granted energy from an EPS 20 to a user 18. This is the time a user is allowed to be connected to the power grid per each received energy grant. Consequently, requests must be issued every time slot to keep a load "on". The amount of energy delivered per time slot may be scaled up in two dimensions: 1) by setting the duration of a time slot in order that an energy packet carries a fixed amount of energy per time slot, or 2) by setting the amount of energy transmitted within a time slot and adjusting the value of voltage or current. Using supercapacitors as energy containers, setting the fixed amount of energy in one energy packet is achieved by adjusting the voltage of each supercapacitor.

Energy Packet Switch (EPS)

Figure 2:
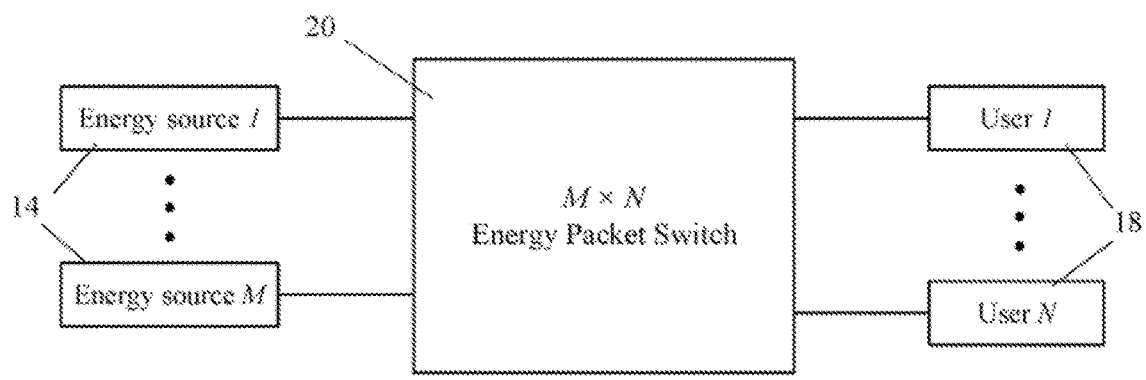
FIG. 2 is a schematic view of an exemplary energy packet switch with M inputs and N outputs in accordance with one or more embodiments disclosed herein.
Figure 3:
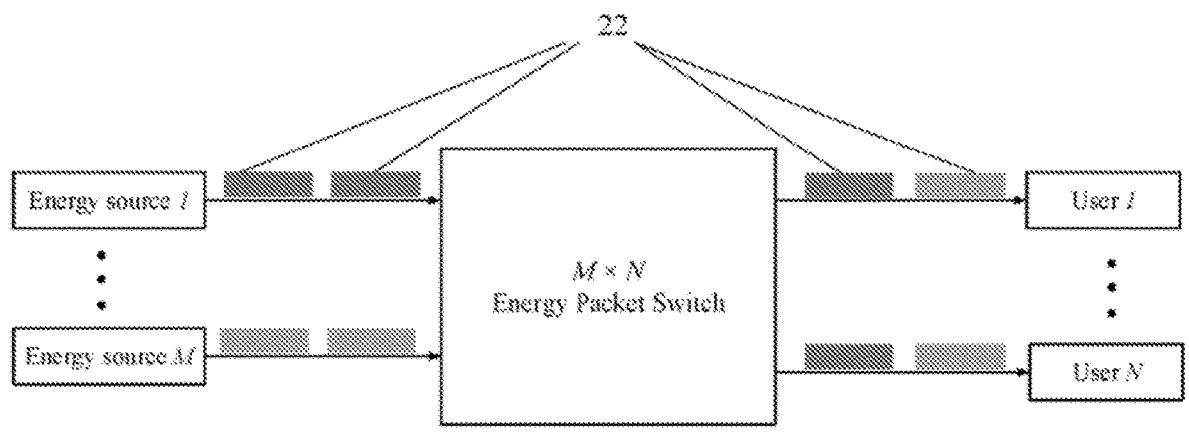
FIG. 3 is a schematic view depicting energy packets transmitted from multiple sources to multiple users through an energy packet switch in accordance with one or more embodiments disclosed herein.

The EPS 20 is a network-controlled switch that may have multiple inputs and multiple outputs. The inputs connect energy sources (or another EPS playing that role) to the EPS and the outputs serve to supply the energy packets to energy-demanding users 18. Now referring to FIG. 2, an M×N (M inputs and N outputs) EPS 20 is disclosed in which the EPS is used to integrate the energy provided by M different energy sources 14 and supply energy to up to N different users 18 where one or multiple loads are connected. As noted, the amount of energy in the energy packets may be fixed by adjusting the voltage of each supercapacitor. Now referring to FIG. 3, energy packets 22 (shown as blue and yellow blocks) are transmitted from multiple energy sources 14 1–M to multiple users 18 1–N. The EPS 20 is able to integrate the energy supplied by multiple energy sources 14 and deliver the energy to a heavily demanding user 18. Similarly, the EPS can also supply the energy requested by multiple users 18 from a single energy source 14. In both scenarios, each source-EPS and EPS-user energy transfer carries a discrete amount of energy, so the energy is actually transferred as an energy packet 22.

Figure 4:
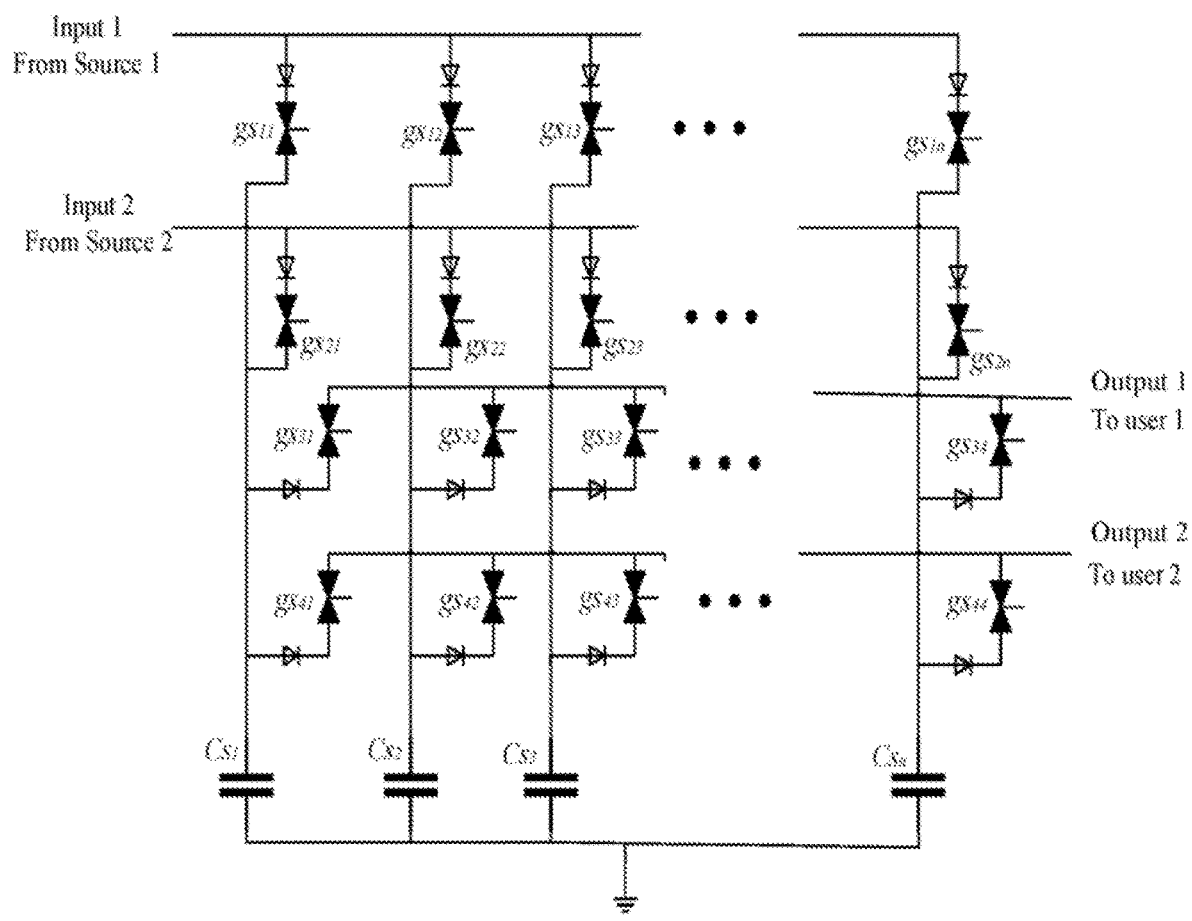
FIG. 4 is a schematic view depicting a 2×2 energy packet switch using supercapacitors as energy containers in accordance with one or more embodiments disclosed herein.

The EPS 20 may use a single supercapacitor or multiple supercapacitors, each of which is a unit of shared energy storage. The EPS 20 may work with AC or DC current. In several of the embodiments the EPS is shown in use with direct current (DC), but it will be apparent to those skilled in the art it can be accommodated to work with AC. Now referring to FIG. 4, a 2×2 EPS with n supercapacitors $C_{s1-n}$, is shown. The energy sources connected to the inputs of the EPS may supply energy to one or multiple supercapacitors each, and one or multiple supercapacitors may store energy for short-term storage and supply that energy to users at fast rates as well. Therefore, the EPS plays the role of a user when receiving energy from sources and the role of a source when transferring energy to a load or user. As shown, combinations of solid-state relays (SSRs) $gs_{11-1n}$, $gs_{21-2n}$, etc. perform the function of switching elements in the EPS. The switching elements are controlled by a controller, which decides which and the number of supercapacitors used to transfer energy to a user according to the amount of energy requested by the user and the amount of energy available in the supercapacitor. The switch elements interconnect one EPS input to one or multiple supercapacitors to receive energy, and interconnect one or multiple supercapacitors to transfer their energy to an EPS output.

Figure 5:
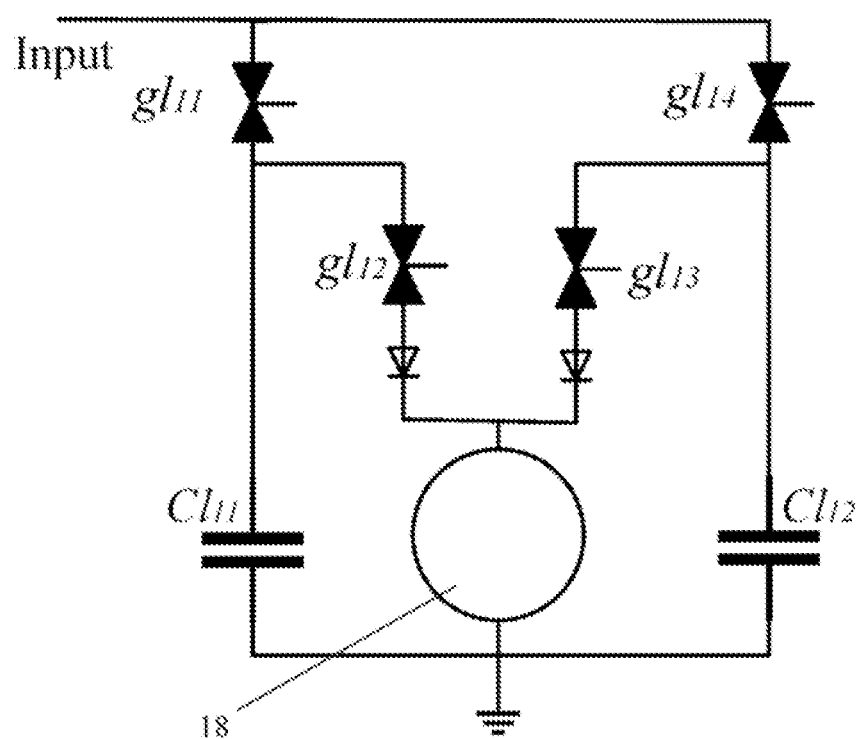
FIG. 5 is a schematic view of a user using supercapacitors as energy containers in accordance with one or more embodiments disclosed herein.

To interface the EPS with users for a proper energy transfer, a user also uses a supercapacitor, as energy storage, to receive the granted energy. By using such supercapacitors, the EPS can provide different amounts of energy in a time slot. The energy provided to a user supercapacitor may be larger or equal to the consumption rate of the user. In this way, the supply may take an equal or a shorter time than the time the user takes to spend it. With reference to FIG. 5, depicted is the structure of a user 18 with two supercapacitors $Cl_{11}$, and $Cl_{12}$ working as energy containers and four switching elements, $gl_{11-14}$, being used for energy routing, implemented for example using SSRs. The user 18 uses the supercapacitors $Cl_{11}$ and $Cl_{12}$, one for receiving energy and the other to provide energy to the load as both tasks cannot be done at once. Therefore, the two supercapacitors $Cl_{11}$ and $Cl_{12}$ provide energy to the user at different times while ensuring the load served receives it continuously during the operation time. That is, while one user supercapacitor receives energy from the EPS, the other supplies energy to the load, and vice versa. For example, in FIG. 5, if $Cl_{11}$ is providing energy to the load, $gl_{12}$ would be closed and $gl_{11}$ would be open. At the same time, $gl_{14}$ is closed and $gl_{13}$ is open to have $Cl_{12}$ receive energy from the EPS. In this way, by using two load supercapacitors, energy can be transmitted continuously to the load.

Control of the EPS

There are two levels of control for the operation of the EPS switch: a) by a top-level request-grant protocol where users and energy sources interact with the switch and b) levels of energy in the recipient and EPS. It will be understood that the number of levels of control could vary.

The request-grant protocol is an operation in which all elements of a digital grid participate to supply or demand energy. Z. Jiang, et al. "Experimental evaluation of power distribution to reactive loads in a network controlled delivery grid," in 2018 Third International Conference on Fog and Mobile Edge Computing (FMEC). IEEE, 2018, pp. 199-204. In short, users, or individual loads, issue a request for needed energy amounts through a data network (e.g., Internet) and each energy source grants amounts of energy to a requesting user or load by issuing notifications through the data network and supplies it through grid lines. The amount of granted energy is capped by the feeder capacity. In this framework, loads, energy sources and EPSs are interconnected through the data network, forming an Internet of Things (IoT) environment.

At the inputs, energy sources send energy packets to the core of the EPS. For that, the EPS and the sources execute the request-grant protocol where the EPS is the load. At the outputs, the EPS supplies controlled amounts of energy as energy packets to the user or load during a time interval (e.g., a single or multiple time slots). In the latter case, the loads and EPS execute the request-grant protocol, where the EPS is the server.

To perform these operations, each supercapacitor is connected to an input or an output of an EPS at any given time slot. The EPS has a fully interconnected network where all inputs may be connected to any supercapacitor and each supercapacitor may be connected to any output. In this way, each input (source) may transfer energy to each supercapacitor. However, only one source can be connected to a single supercapacitor at a time to avoid undesirable connections between sources. On the output side, a load may receive energy from one or multiple supercapacitors.

Because EPS energy storage is based on supercapacitors, a user (or individual load) also uses a supercapacitor as an interface to receive the granted energy. Energy is then supplied through a supercapacitor-supercapacitor circuit. The advantages of using this approach are that energy transfer is fast and sums of energy can be transferred in each opportunity a load is granted to minimize the number of required transfers. The levels of energy transferred are dependent on the size of the used capacitance and the voltage (charge) difference between the source capacitance (Cs) at the EPS and the load capacitance (Cl) at the load.

For example, the EPS may be modeled as a source capacitor Cs and the amount of charge and energy are given by:

$$Cs = \frac{q_s}{v_s} \qquad (1)$$

where $q_s$ is the charge held by Cs and Vs is the voltage between its terminals. The amount of energy $U_s$ in $C_s$ is given by:

$$U_s = \int_0^{q_s} \frac{q_s}{c_s} dq_s = \frac{1}{2} C_s V_s^2 \qquad (2)$$

In a practical case Cs>Cl such that energy flows from Cs to Cl. However, having Cs=Cl may also be considered. Another method to achieve energy flow to Cl is by using a voltage differential between Cs and Cl. It is convenient to have Cs fully charged before any energy transfer as energy source can continuously provide energy (not necessarily at the same strength all the time). Then, a user or load may get connected to EPS (or Cs) for energy transfer and during that time the EPS is disconnected from any energy sources. The energy in Cl, which is the combined amount of energy, $U_{sl}$, minus that in Cs depends on how much charge there is in Cl, or at which voltage both capacitors reach:

$$U_{sl} = C_s V_s^2/2 = C_{sl} V_{sl}^2/2 \qquad (3)$$

where $C_{sl}$ and $V_{sl}$ are the equivalent capacity of the circuit that includes Cs and Cl and the voltage on the terminals of the capacitors after the energy transfer, respectively. The combined capacitance is modeled as an increased capacitance, Cs+Cl.

The energy difference that EPS may transfer to a load depends on the amount of energy on both capacitors, or:

$$U_l = U_{sl} - \frac{Cl}{2(Cl + C_s)} C_l V_{sl}^2 \qquad (4)$$

$$\text{where } V_{sl} = \frac{C_s + V_s + ClVl}{C_s C_l}$$

In this way, the new energy transferred to Cl depends on the charge of Cs and Cl itself before the energy transfer. The charge of Cl is provided to an EPS on the request issued by the load (Cl) and Cs could adapt voltage, capacitance, or a combination of both, according to the amount of energy that is to be granted to Cl in a time slot. In this embodiment, a fixed voltage is used so that EPS adapts Cs. Therefore, Cs can be n Cl, where n=(1, . . . , k).

Examples of Energy Exchange

The operation of the EPS is largely based on the charging/discharging process of the supercapacitors with configurable capacitance. A supercapacitors can charge and discharge at a very fast rate, if no large (or low) resistance is connected in series to it. Furthermore, the energy density of supercapacitors continues to increase, and the amount of energy that can be stored in today's supercapacitors makes them applicable to higher-power loads. Batteries may also be employed.

Figure 6:
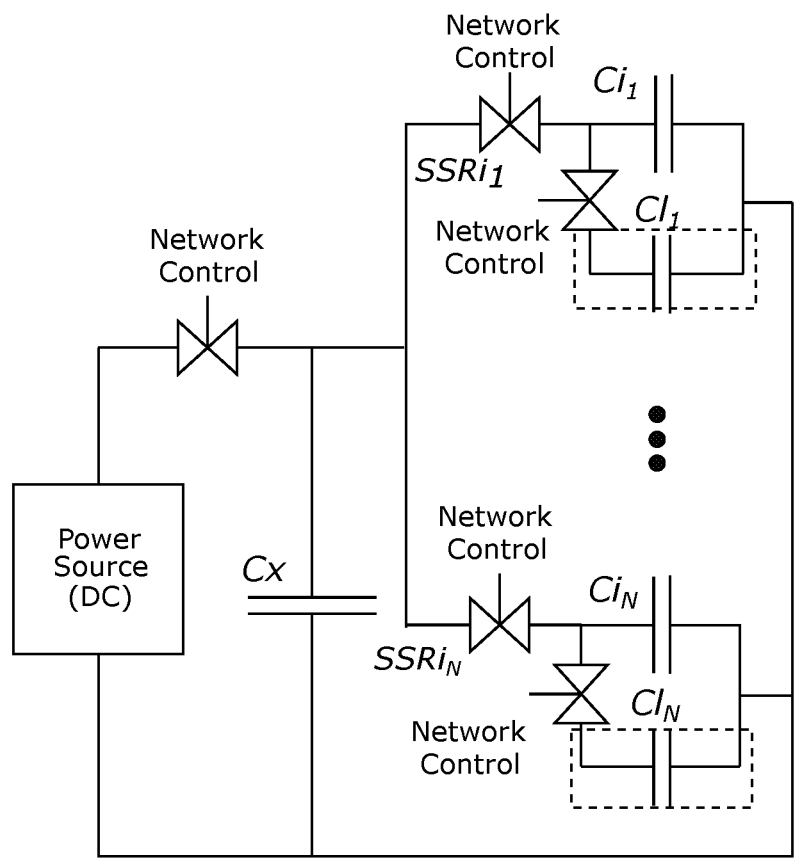
FIG. 6 is a schematic view of a testbed to transfer discrete energy to N separate capacitive loads (half cycle) in accordance with one or more embodiments disclosed herein.

Now referring to FIG. 6 depicted is an example of a system to transfer energy from an EPS to N separate loads. Here, SSRs are used as controllable switches that enable charging a supercapacitor or passing energy from the supercapacitors in the EPS to the supercapacitor interface (Ci) that is connected to requesting users (using Cl as receiving capacitor). The gate of an SSR is network controlled; meaning that a power access point (PAP) enables the SSR (labeled as Network control in FIG. 6) after information is received from the data network. In this example of energy transfer, the connection is shown when Cs=Cl (i.e., a single source capacitor to a single load capacitor).

For a fast-paced energy transfer, current limiters based on passive resistance are avoided and an energy source with high-current capacity may act as a fast-charging supply to rapidly charge the supercapacitors in the EPS. In turn, the EPS may act as a fast-charging-discharging device. Although loads may also receive charge at a fast rate (via Cl), they may consume energy at slower rates.

Figure 7:
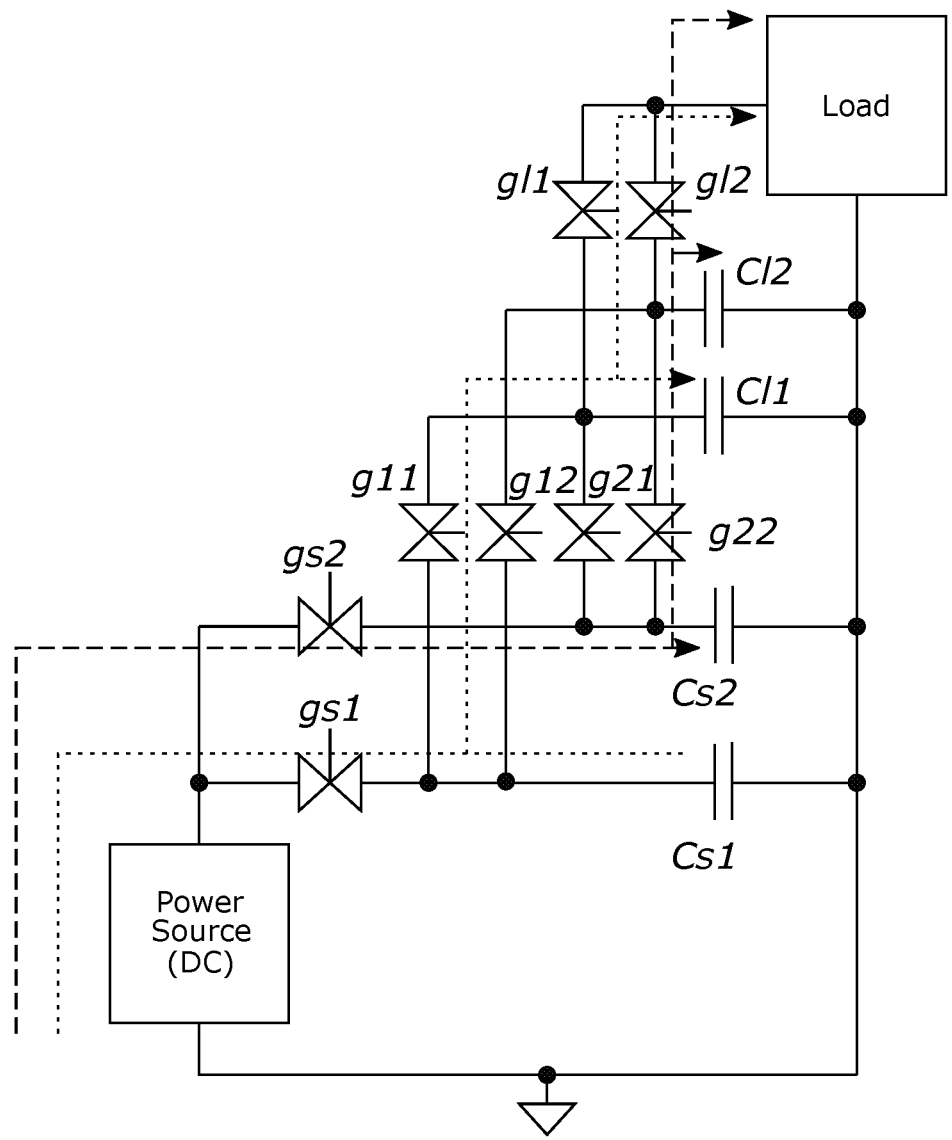
FIG. 7 is a schematic view of a testbed to continuously transfer discrete energy to a load (full cycle) in accordance with one or more embodiments disclosed herein.

FIG. 6 shows a circuit that charges one or multiple loads, but in such an approach the user or load supercapacitor can either receive or supply energy (half duplex interface). That limitation can be overcome by increasing the number of components, as shown in FIG. 7. With reference to FIG. 7, there are two Cls, each of which alternates roles (charging/discharging) for a continuous energy supply. In this circuit, there are two interface supercapacitors for the load. Each supercapacitor may charge during alternating half cycles and discharge in the same fashion. That is, while one supercapacitor charges, the other supplies energy to the load, and vice versa. For the sake of simplicity, FIG. 7 includes two paths (either arrow indicates a path; each path may be used in one charging/discharging cycle) followed by the energy flow from Cs to one of the interface capacitors (Ci) and towards Cl. A similar operation occurs with the Cs and Cis.†

Figure 8:
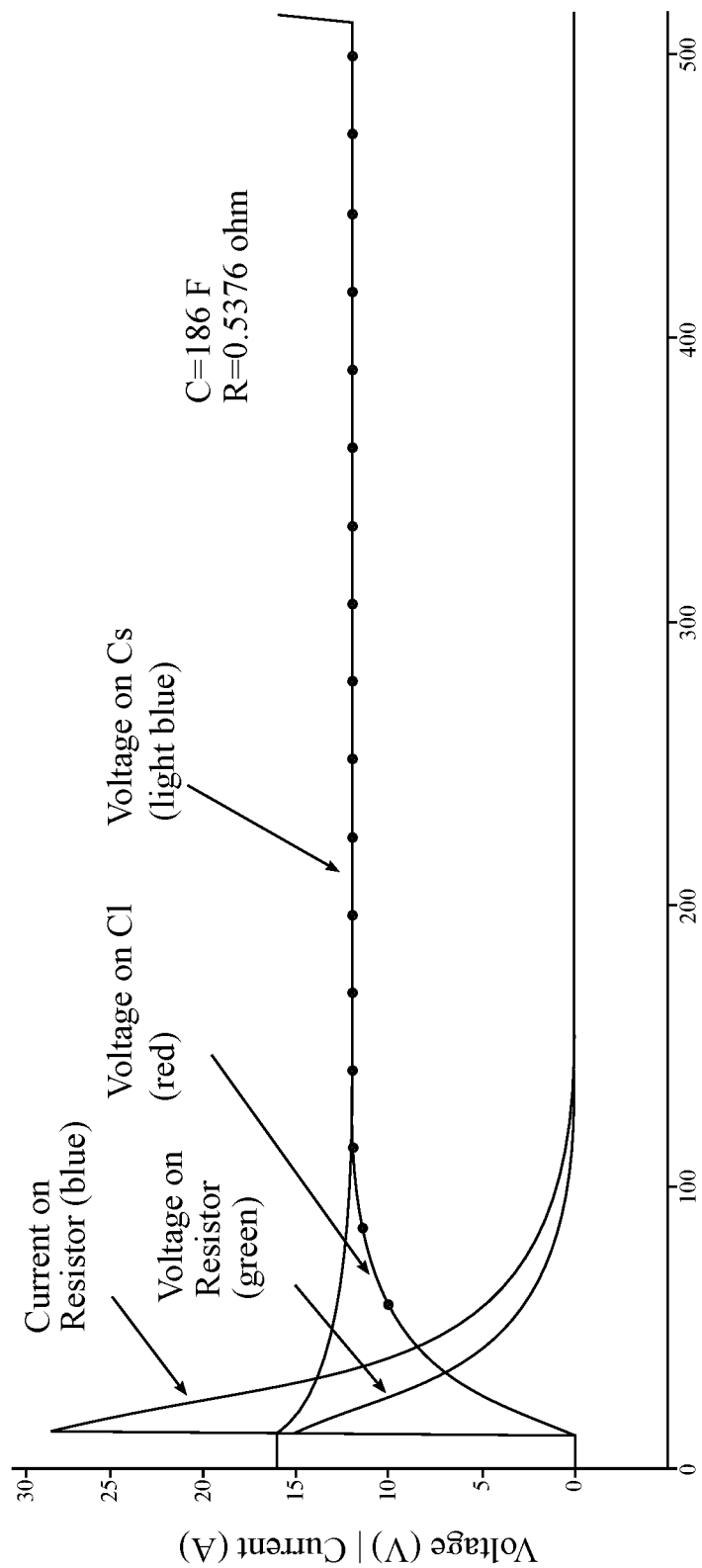
FIG. 8 is a graphical depiction illustrating current and voltage response on energy transfer to load capacitor Cl in a resistive circuit in accordance with one or more embodiments disclosed herein.
Figure 9:
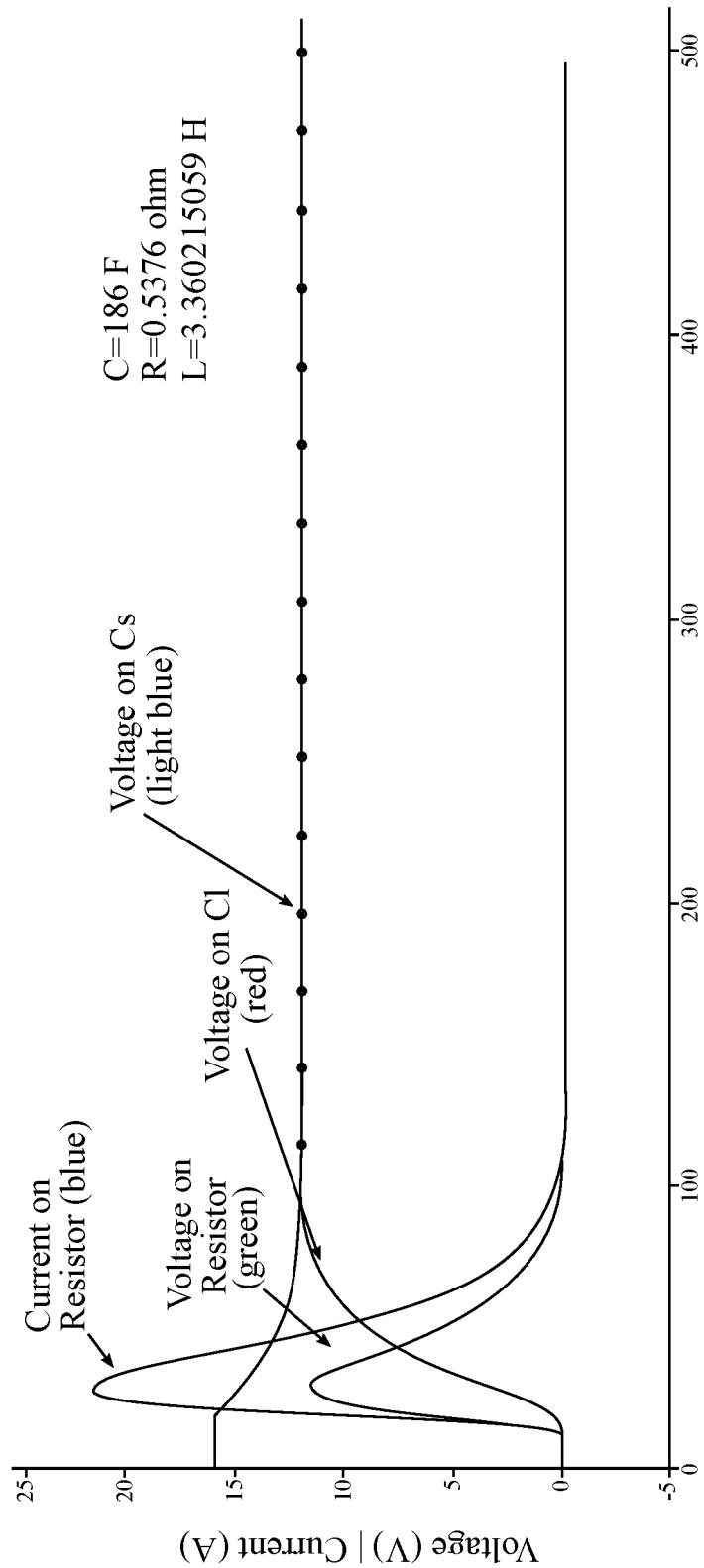
FIG. 9 is a graphical depiction illustrating current and voltage response on energy transfer to load capacitor Cl in a resistive circuit in accordance with one or more embodiments disclosed herein.

With reference to FIGS. 8-12, energy may be exchanged between two capacitors (one at the switch and another at the user premises) to perform a controllable energy delivery. Now referring to FIG. 8, depicted is the charging process of a capacitor when it is exposed to an unlimited amount of energy (i.e., current) but with a voltage set to 12 V. FIG. 8 shows the capacitor gets a charge proportional to the voltage and charges at speed paced by the RC constant, where R is the resistance on the circuit and C the capacitance of the (charge receiving) capacitor (Cl). As FIG. 8 also shows, an ideal capacitor is charged at a very fast rate under an energy source with unlimited current capacity, but the amount of current that circulates through the circuit is also very large and so is the amount of dissipated power. This may be damaging for the circuit as time passes. Therefore, it may be desirable to manage the amount of current that can be transferred in the energy packet switch. To achieve this, an inductor may be added, connected in series with the load (and capacitor). This circuit may reduce energy losses that otherwise may occur with the use of a resistive limiter. With reference to FIG. 9, a charging process in such a Resistance-Capacitance-Inductance (RCL) circuit is shown. FIG. 9 shows that the amount of current used to charge the capacitor effectively decreases but the presence of the inductance generates oscillations that need to be considered in estimating the charge of the capacitor.

Figure 10A:
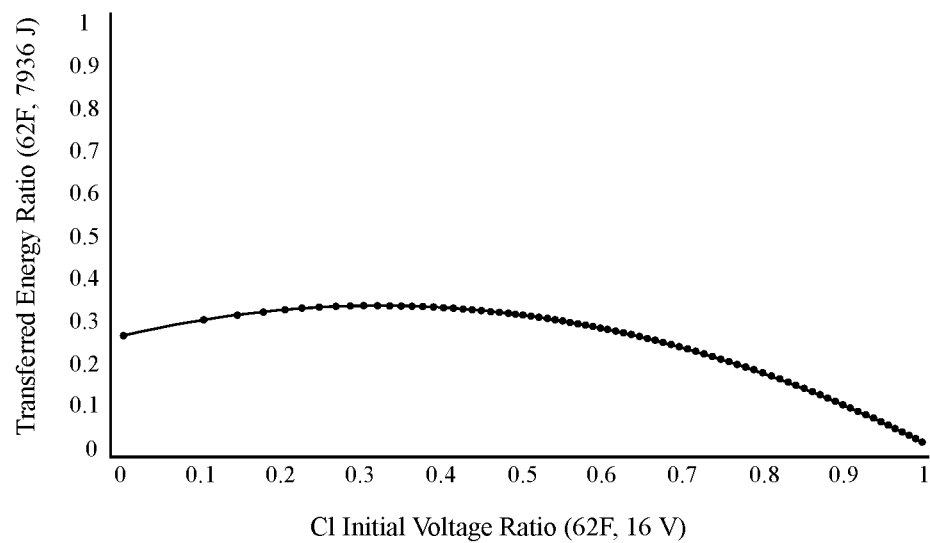
FIG. 10A is a graphical depiction showing energy transfer from Cs to Cl where Cs=Cl in accordance with one or more embodiments disclosed herein.
Figure 10B:
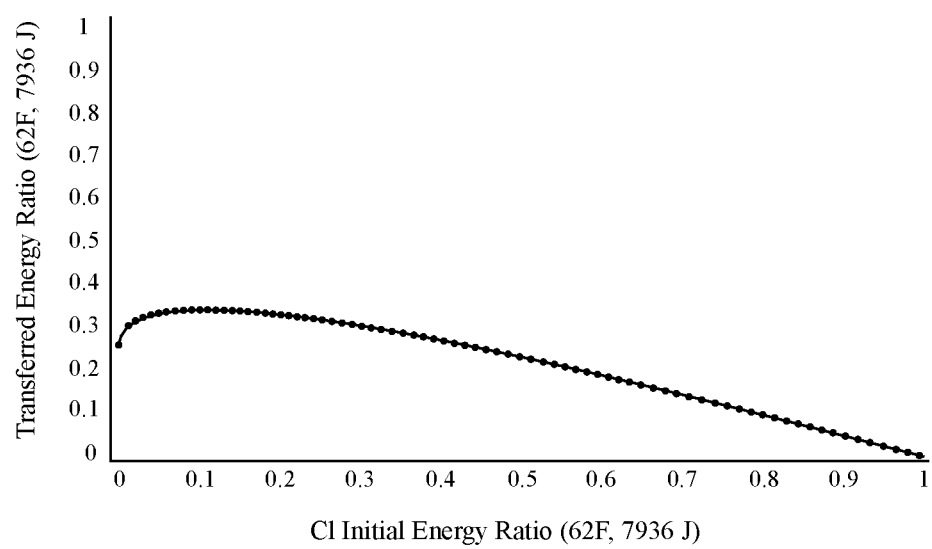
FIG. 10B is a graphical depiction showing energy transfer from Cs to Cl where Cs=Cl in accordance with one or more embodiments disclosed herein.

For the exchange of energy between Cs and Cl, different size ratios can be considered in a capacitive circuit. Specifically, the Cs–Cl ratio is Cs/Cl or the number of times Cs is larger than Cl. Now referring to FIG. 10A depicted are the voltage changes on Cl for a Cs always fully charged (voltage of Cs equals that of the source) as initial condition. With reference to FIG. 10B, depicted is the amount of energy transferred from Cs to Cl when their capacitance ratio is 1 (i.e., Cs=Cl) and, with Cs charged to 12V and for Cl holding different level of charge (measured in volts through its terminals). As FIG. 10B shows, the maximum transfer of the energy is achieved when Cl has a small charge, therefore, showing an optimal point. As expected, as the charge of Cl increases, the amount of transferred charge decreases. This slowdown on the amount of energy charge is due to decreasing difference of voltages between Cs and Cl.

Figure 11:
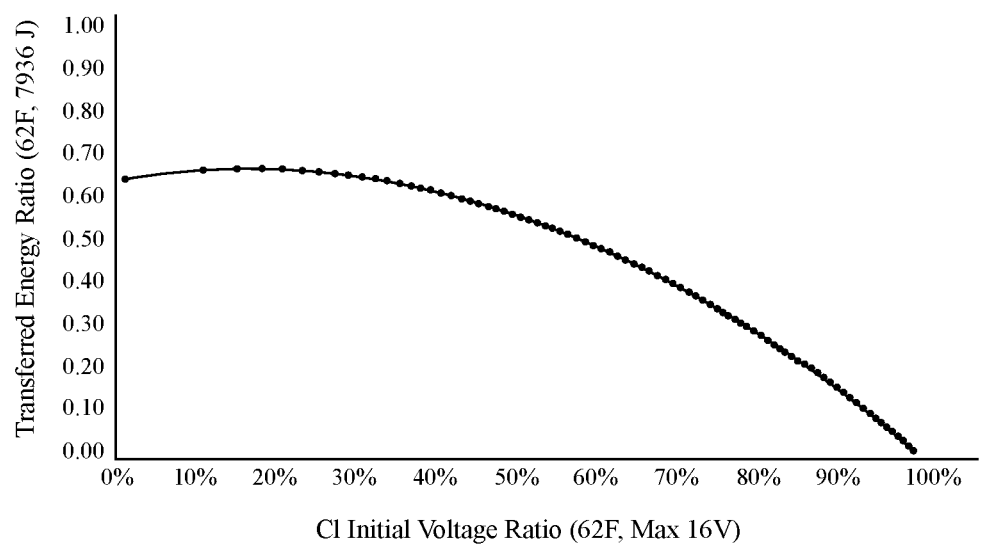
FIG. 11 is a graphical depiction showing energy transfer from Cs to Cl where Cs=4Cl in accordance with one or more embodiments disclosed herein.

Now referring to FIG. 11 the capacitance ratio is Cs/Cl=4/1=4. In this case, the trend of the transferred energy is similar as before, but the largest amount of transferred energy ratio is now about 0.67. This ratio represents about twice the energy transferred as compared to that for Cs=Cl. This is, a larger Cs capacitance allows for a larger transfer of charge to the load capacitor.

Figure 12:
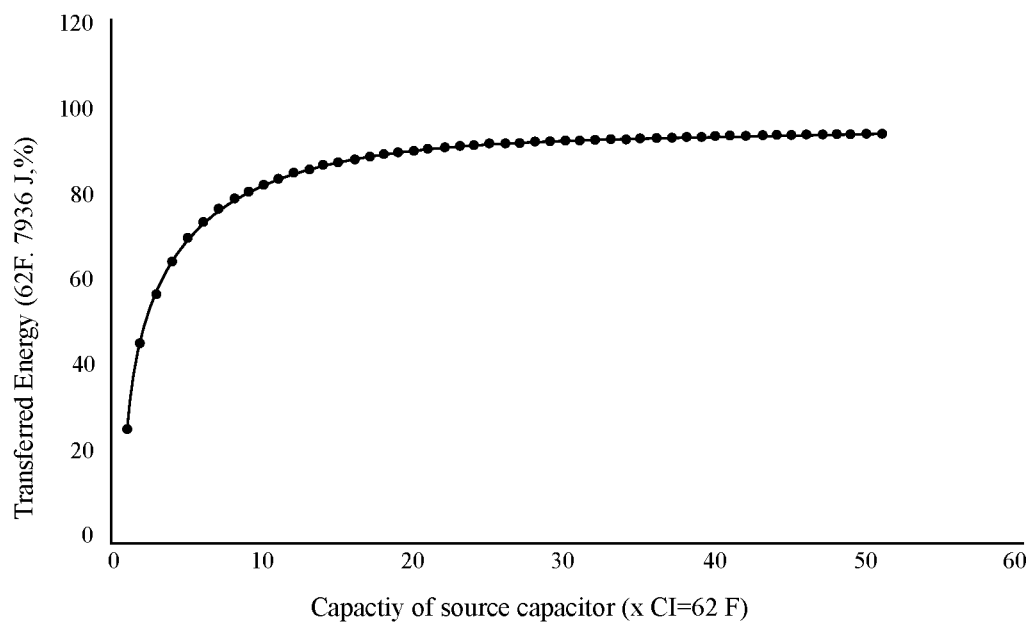
FIG. 12 is a graphical depiction showing energy transfer from Cs to Cl as a function of Cs capacity in accordance with one or more embodiments disclosed herein.

Now referring to FIG. 12, depicted is a general case of energy transfer ratio for general Cs capacitance vs Cl, but for a discharged Cl as initial condition. As expected, the amount of energy transfer increases as the capacitance of Cs increases. However, the major contributions of transferred energy occur for Cs=4Cl. Although the increase of Cs also increases the amount of transferred energy, this increase becomes less significant for larger ratios. Note that for charging Cl to close to 100% (approaching to V s), it would require an infeasible large Cs capacitance.

Figure 13:
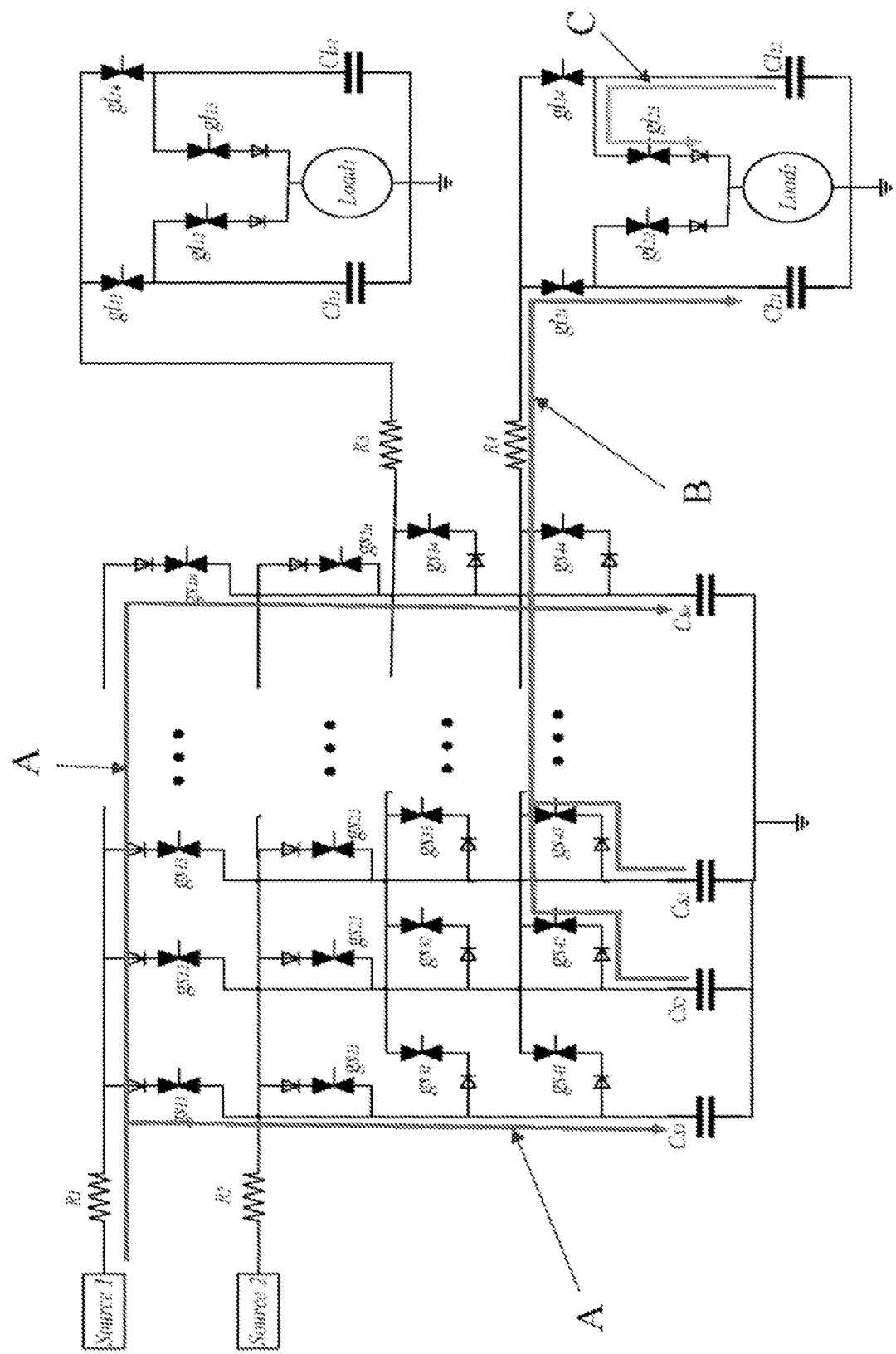
FIG. 13 is a schematic of an EPS testbed with two energy sources and two users in accordance with one or more embodiments disclosed herein.

Now referring to FIG. 13, depicted is how energy is transferred in a 2×2 EPS testbed. Two energy sources and two users are connected with the EPS. As shown, $gs_{11}$, which may be implemented by an SSR, is the network controllable switch that connects an input (or output) port with a supercapacitor $Cs_1$. Similarly, $gs_{11}$ is the network controllable switch that connects the EPS with a supercapacitor the user (Cl), or Cl with the load. The network controllable switches (not to be confused with the EPS), e.g., SSRs, are controlled by power access points (PAPs), which are the CDG components used by a user and the EPS as interfaces with the power grid and data network and enable charging supercapacitors or passing energy from the supercapacitors in the EPS to the supercapacitor that is connected to requesting loads. By using the PAPs to control the status (i.e., open or closed state) of the SSRs, proper energy distribution routes can be established. For example, the line designated A shows the routes from where Cs1 and Csn get energy and the line designated B represents the routes where Cs2 and Cs3 work together to provide energy to Cl21. At the same time, if $load_2$ requires some amount of energy, Cl22 can provide energy to it. The line designated C shows the energy flow.

EXAMPLES AND EXPERIMENTS

Figure 14:
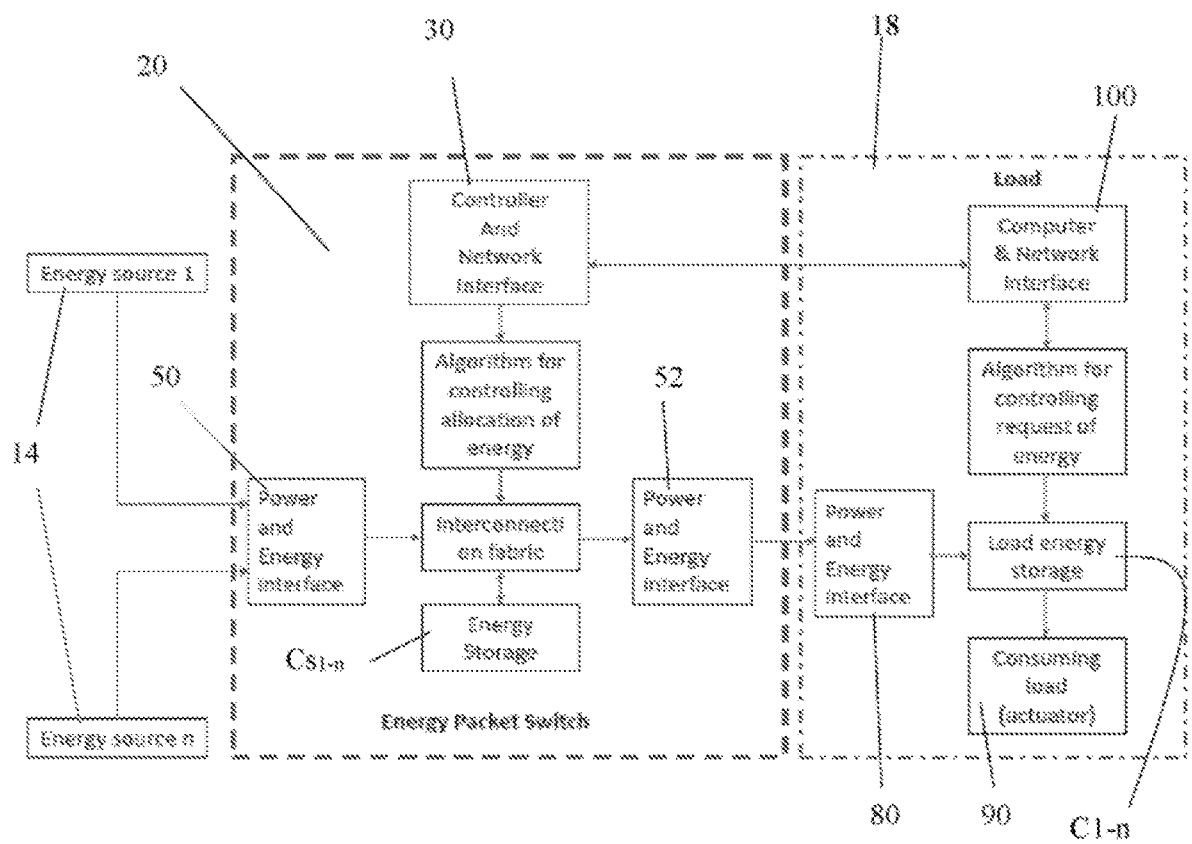
FIG. 14 is a diagrammatic view of an EPS device coupled to a load, data network and 1–n energy sources in accordance with one or more embodiments disclosed herein.
Figure 15:
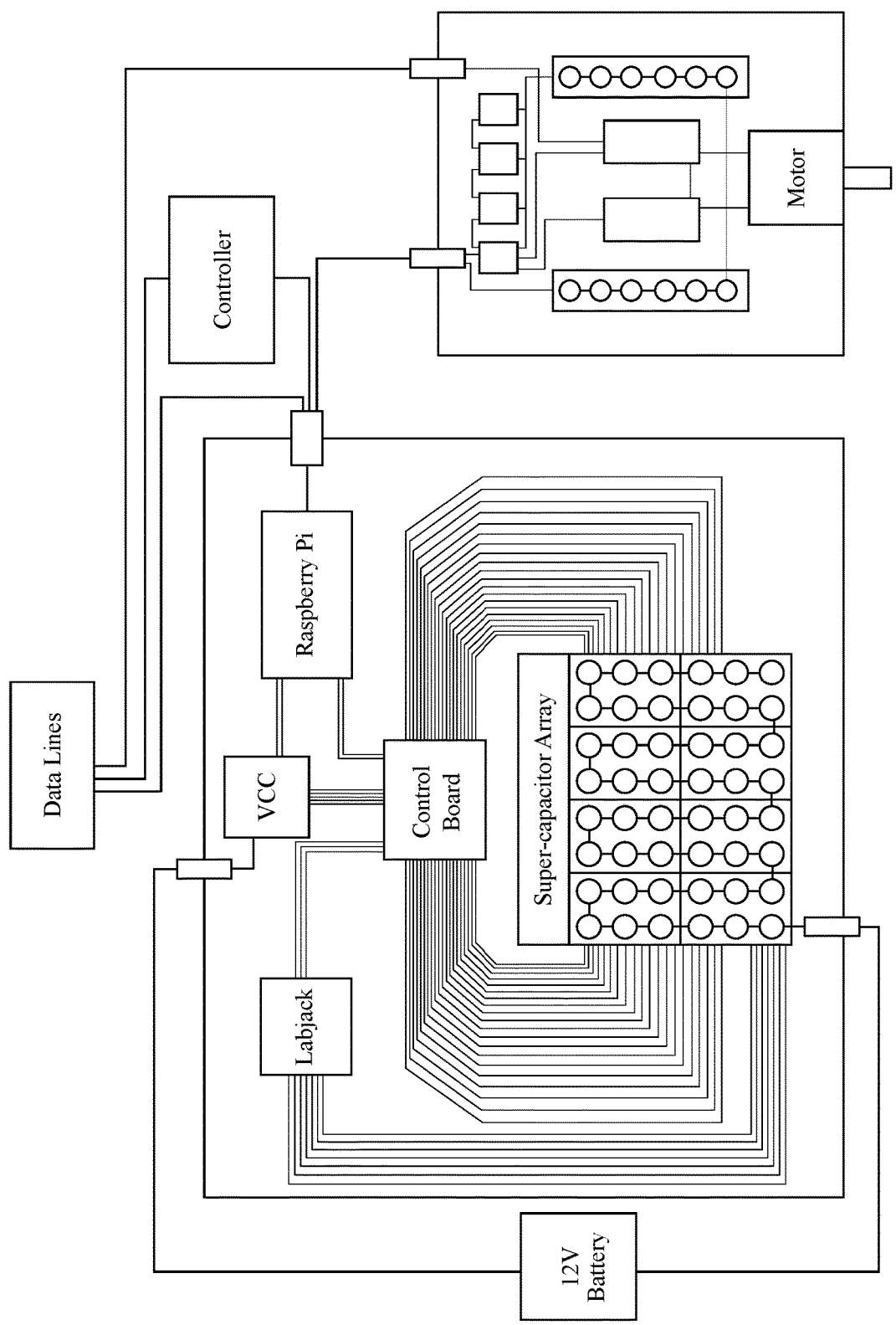
FIG. 15 is a photographic view of an experimental EPS testbed in accordance with one or more embodiments disclosed herein.

With reference to FIG. 14, a general scheme corresponding to the components in FIG. 15 includes an EPS 20 coupled to a user (or load) 18 and at least one energy source 14 via an energy inlet interface 50 such as but not limited to a high-power cable through limiting resistors used to protect the electronics of the EPS 20. The energy inlet interface 50 is coupled to an interconnection fabric, which may be and/or include network controllable switches such as SSRs as previously described, coupled to the supercapacitors $Cs_{1-n}$, and an energy outlet interface 52 such as but not limited to a high-power cable that may have a limiting resistor or any other device that can limit the maximum current that can circulate through the cable to protect the electronics of a load. The EPS 20 includes a central controller and network interface such as but not limited to a PAP coupled to the interconnection fabric. Any suitable PAP may be employed, such as but not limited to a Raspberry Pi (commercially available from Raspberry Pi Foundation, UK) or the like.

The interconnection fabric includes nodes which may be or include one or more processors, a memory, switching elements and/or peripherals operably linked via functional connections between nodes. In one or more embodiments the interconnection fabric is or employs an SSR array which interconnects inputs to supercapacitors and/or supercapacitors to outputs.

The central controller 30 is any suitable computing device and includes software operable to run one or more algorithms, including one operable to control the allocation of energy and one for controlling requests for energy. By way of example, a central controller may be implemented using know hardware, firmware, and/or software, as well as specialized software for carrying out energy monitoring and data communication operations. For example, the central controller may include a data processing unit (or processor) and a memory operatively coupled by way of a data and/or instruction bus. The processor may be implemented utilizing any of the known hardware, such as a digital microprocessor, a computer (such as a portable, a stationary and/or a distributed computing system), or any of the other known and/or hereinafter developed data processing units. The memory may be implemented by way of separate hardware or may be disposed within the data processing unit, and any of the known hardware and/or software for implementing the memory function may be employed.

Data are preferably input to, and output from, the data processing unit by way of an input/output device (or I/O interface). Operators may desire to input software programs and/or data into the computer by way of an external memory that is coupled to the I/O interface by way of a suitable link (such as a cable, wireless link, etc.) The external memory may be implemented via a flash-drive, disc, remotely located memory device, etc.

The central controller may also include an interface device, which is operatively coupled to the I/O interface of the computer via a suitable link, such as a cable, wireless link, etc. The interface device includes at least one display as well as an input device, such as a keyboard, mouse, voice recognition system, etc. An operator preferably utilizes the interface device to provide information to the central controller in connection with entering appropriate data and/or programs. The central controller manipulates data via suitable software code in accordance with various embodiments of the invention and may display results on the display for consideration by an operator. In accordance with well-known techniques, the results may also be stored within the memory of the central controller, output and saved on the external memory device, and/or provided in any of a number of other ways.

Any suitable software may be employed to implement the devices, systems and methods disclosed herein The software used in the experiments are programs developed for controlling the EPS written by the inventors in Python language. For the experiments, python3 server.py was used to run the server program at the EPS controller (Rasberry Pi) and python3 client.py was used to run the client program at the PAP (Raspberry Pi).

Server.py is for the EPS and client.py is for the load. Also, ssh pi@A.B.C.D. was used, where A.B.C.D. is an IP address, to connect to any of the Raspberry Pis. One program is used for an energy transmitter or EPS, and another for a receiver or the load. The algorithm for the transmitter follows the description of the operation of the switch as described herein and it works automatically once the EPS is on. The algorithm for the load follows a demand for energy and determines when and how much energy to request for a multitude of possible re-charging policies. These policies depend on how a user wants to handle energy storage implemented such as by, but not limited to, supercapacitors or other energy storage devices. It will be apparent to those skilled in the art that various software code and commands may be employed in implementing the devices, systems and methods disclosed herein.

The EPS 20 is coupled to a user 18 which includes its own energy interface 80, load energy storage $Cl_{1-n}$ such as one or more supercapacitors, the consuming load 90, and a computer and network interface 100 such as a PAP.

A collection of interconnected EPSs may form a network or microgrid. In such a network EPSs play the role of transmitter and receiver of energy. A transmitter is considered a source by the receiving EPS. An EPS working as a load also may issue requests for energy to a transmitting EPS. A transmitting EPS issues grants, as described herein. Thus, any number of EPSs can be connected in cascade (e.g., one after the other) to achieve transmission of energy to multiple segments of a microgrid such that a control point in each EPS is enabled that works as a node.

Figure 14A:
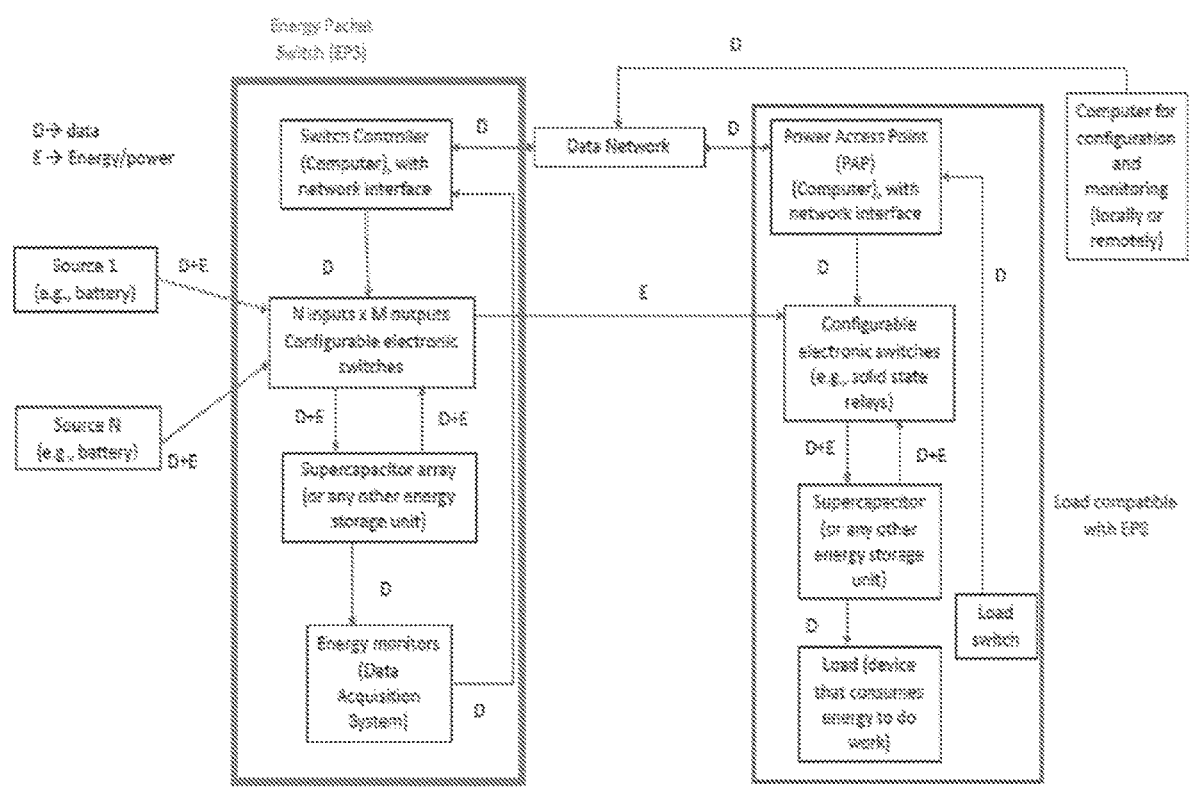
FIG. 14A is a diagrammatic view of energy and data flow in an EPS device coupled to a load, data network and 1–N energy sources in accordance with one or more embodiments disclosed herein.

Now referring to FIG. 14A, data and energy flow in an exemplary system is shown.

Now referring to FIG. 15, by way of further illustration an exemplary 2×2 EPS testbed is disclosed including an EPS coupled to a user and a 12V battery as an energy source. The EPS includes eight supercapacitor arrays, where each array is a set of six supercapacitors. Each supercapacitor is 83.3 Farads. It will be understood that the number of arrays could vary and that the number of supercapacitors in a set could vary. The consuming load is a motor. A central controller is coupled to the EPS. In the experiments a laptop computer was used as a central controller. Both the EPS and user are each coupled to one PAP. In the experiments Raspberry Pi 3 Model B were employed as PAPs. However, the implementation of a PAP may be implemented with any computer, dedicated or programmable hardware, or software system. The EPS includes an interconnection fabric which includes an array of switching elements and a digital acquisition card (DAQ) used to monitor the voltage of the supercapacitors. The DAQ may be any suitable DAQ such as but not limited to a Labjack DAQ available commercially from Labjack Corporation of Lakewood, Colo. In the experiments a Labjack U3-HV was used for voltage monitoring. The DAQs enable the central controller to obtain real-time voltage readings from the supercapacitors. The voltage is used to estimate the amount of energy in the supercapacitors.

The SSR array is used as a switch fabric to interconnect inputs to supercapacitors and supercapacitors to outputs. The central controller connects to the data network and runs a program that interpret the requests for energy sent by the load through the data network and decides which supercapacitor is needed to satisfy that requests so that the supercapacitor is connected to the corresponding output. The central controller then configures the SSRs so that the energy source charges the unused supercapacitors as needed. As noted, the DAQ measures the voltage on the supercapacitors to monitor the amount of energy in them. The controller and electronics of the EPS receive energy for their operation from a common voltage source. In addition, the EPS has a network interface to communicate with compatible sources and loads.

The load in FIG. 15 uses two supercapacitors that receive the energy of the EPS, a Raspberry Pi 3 Model B as PAP and controller, and a small fabric of relays (SSRs) to transfer energy to and from the supercapacitors to a DC motor that consumes the energy. The network interface in the experiments was a Netgear Gigabit Ethernet network interface. It will be apparent to those skilled in the art other Ethernet or Gigabit Ethernet switch would work as well. The central controller included software which ran the algorithms to control the allocation of energy and requests for energy. The controller software also was used for communicating on a data network such as the Internet. The code for the experiments was written in Python.

By following a request-grant protocol, the EPS communicates with the user via PAPs. The request-grant protocol was run by the compatible load and the EPS. The issuing of requests and grants is programmed in the software. The requests are issued at random times and the grants are issued by the EPS as a response to the requests. These communication signals are included in the software. After the execution of the request-grant protocol, energy packets are issued and the energy packets are sent to the user whose address matches that in the request and grant data packets. By controlling the status (i.e., open or closed) of the SSRs, the PAPs also determine when energy is transmitted and received by a selected supercapacitor. In a network including multiple EPSs, the SSRs configure distribution routes for passing the energy from EPS to EPS until reaching the load.

In the testbed, energy packets are formed and transmitted by adjusting the voltage of a supercapacitor. More precisely, when k supercapacitors of the EPS receive energy, the energy in a packet is:

$$E_{ss} = \tfrac{1}{2} k C_s (V_{s0}^2 - V_s^2) \quad (1)$$

where Cs is the capacitance of each source supercapacitor (a capacitor that supplies energy) and Vs and Vs0 are the voltages before and after charging the supercapacitors, respectively. Similarly, if energy is transmitted between the EPS and a load:

$$k C_s (V_{s0} - V_s) = C l (V_l - V_{l0}) \quad (2)$$

where Vl and Vl0 are the voltage of the load supercapacitor before and after receiving the charge, and Cl is the capacitance of the load supercapacitor. Then, the amount of energy transferred between the source and load supercapacitors is:

$$E_{st} = \tfrac{1}{2} C l (V_l^2 - V_{l0}^2) \quad (3)$$

Here, (2) shows the charge conservation when charging the load supercapacitor by using k supercapacitors in the EPS and (3) is the amount of energy contained in the energy packets transmitted to the user.

The EPS works as follows: At first, the voltages of all the supercapacitors in the EPS are initialized to Vs0 by the energy source. The user supercapacitor sends a request for energy to the EPS when the voltage is below a threshold tL. It should be noted that this is a re-charge policy used by the load or supercapacitors but any other policy, such as one that tops off the charge of the supercapacitors at any time, may be used instead or in combination. The operation of the EPS and the compatible loads may accommodate a large number of policies. The request message contains the IP address and the target voltage Vl of the user supercapacitor. After receiving the request, the EPS calculates the number of supercapacitors, k, required to charge the user's supercapacitor according to (2) and assign them to the requesting load. If there are k or more supercapacitors available in the EPS, they are assigned to the load in the following time slot while a grant is issued through the data network. The amount of energy carried by the energy packet is given by (3). After transmitting their energy, the k supercapacitors are recharged to the maximum voltage by the energy source. The amount of energy transmitted from the energy source to the EPS is given by (1).

When the load is ON (consuming energy), one of the user supercapacitors supplies the energy to the consuming load. The other supercapacitor may recharge according to either of the two policies: a) least frequency transfer or b) top-off.

In the least frequency transfer policy, the supercapacitor issues a request of energy to the EPS when Vl<tL for the amount of energy that can be stored in a time slot. The amount of energy depends on the duration of the time slot and the maximum permissible current.

Figure 16A:
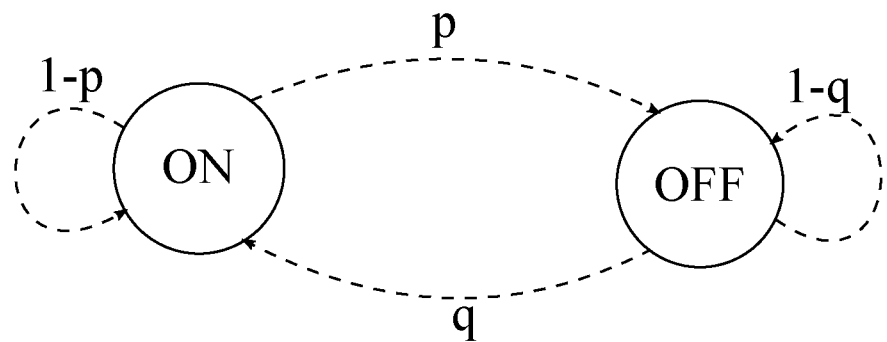
FIG. 16A is a schematic view of a two-state (ON-OFF) Markov model in accordance with one or more embodiments disclosed herein.
Figure 16B:
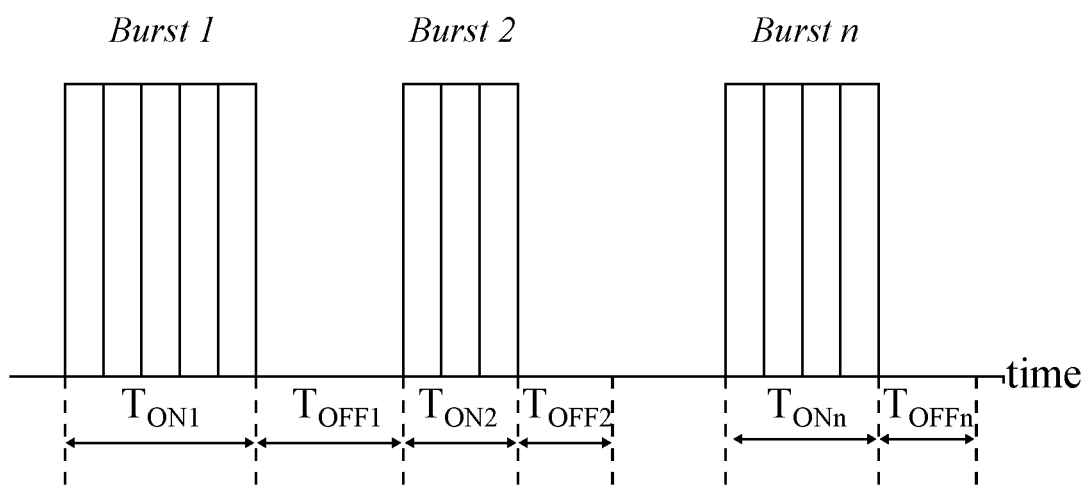
FIG. 16B is a graphical depiction of burst and idle time of a load simulated by the ON-OFF model in accordance with one or more embodiments disclosed herein.

Now referring to FIG. 16A, the behavior of a load for turning ON and OFF is modeled as a two state (ON-OFF) modulated Markov process. The state of the load is currently ON becomes OFF with probability p, or remains ON with a probability 1−p. Similarly, if the state of the load is current OFF, it changes the state to ON with a probability q and remains OFF with probability 1−q. This model produces the ON and OFF state for multiple consecutive periods of time whose duration are set by the probabilities p and q, and which behavior, with reference to FIG. 16B, displays a burst-idle pattern. In FIG. 16B, TONn represents the n-th burst period followed by the n-th idle period, TOFFn. The total length of time the ON-OFF model as executed, T, is:

$$T = n(\widetilde{T_{ON}} + \widetilde{T_{OFF}}) \quad (4)$$

where n is the number of cycles used in T, $\widetilde{T_{ON}}$ is the average burst ON period and $\widetilde{T_{OFF}}$ is the average OFF period, both in number of time slots and each of which can be calculated as:

$$\widetilde{T_{ON}} = 1/p \quad (5)$$

$$\widetilde{T_{OFF}} = (1-q)/q \quad (6)$$

Experiments were performed on the testbed shown in FIG. 15 using an EPS, up to two 12V batteries, and a load compatible with the EPS (that is, a load that is able to communicate with the EPS and that uses a PAP). The load and EPS communicate through a data network (as in the testbed) or through the power lines. Table I shows some parameters used in the experiments. It should be noted that these parameter were used as a scaled down demonstration but the concept of the EPS and the loads may accommodate any other voltages and any other parameters that serve to satisfy the amount of energy and power needed for a specific application.

TABLE I

Parameters used in the experiments
Parameters of the EPS testbed

| | | |
|---|---|---|
| EPS | Number of supercapacitors | 8 |
| | Max. voltage of supercapacitors | 7.5 V |
| User | Number of supercapacitors | 2 |
| | Threshold (Vl0) | 2.8 V |
| | Target voltage (Vl) | 4.2 V |
| | Load | A DC Motor |
| ON-OFF | Total time (T) | 1 hour |
| | Cycle time | 20 s |
| | Time slot | 2 s |
| Others | Resistors | 0.5 Ω, 1 Ω or 2 Ω |
| | Maximum currents | 3.75, 7.5, and 15 Amp |
| | Energy source (battery) | 12 V |

Validity of the Testbed

As noted, the behavior of the load (e.g., a DC motor) is modeled as a two-state (ON-OFF) Markov process, where the load performs work when it is in the ON state and remains idle in the OFF state. Therefore, the load requires energy to perform the work during the ON state. According to (5) and (6), the average burst time, $\widetilde{T_{ON}}$, and the average idle time, $\widetilde{T_{OFF}}$, are controlled by adjusting the probabilities p and q. The ratio of the average burst time is:

$$r = \widetilde{T_{ON}} / (\widetilde{T_{ON}} + \widetilde{T_{OFF}}) \quad (7)$$

A larger average burst time indicates the load requires energy for a longer period of time, in consecutive time slots. This demand also means that the load consumes energy from the supercapacitor at a higher average rate during T but at constant rate during TON.

Figure 17:
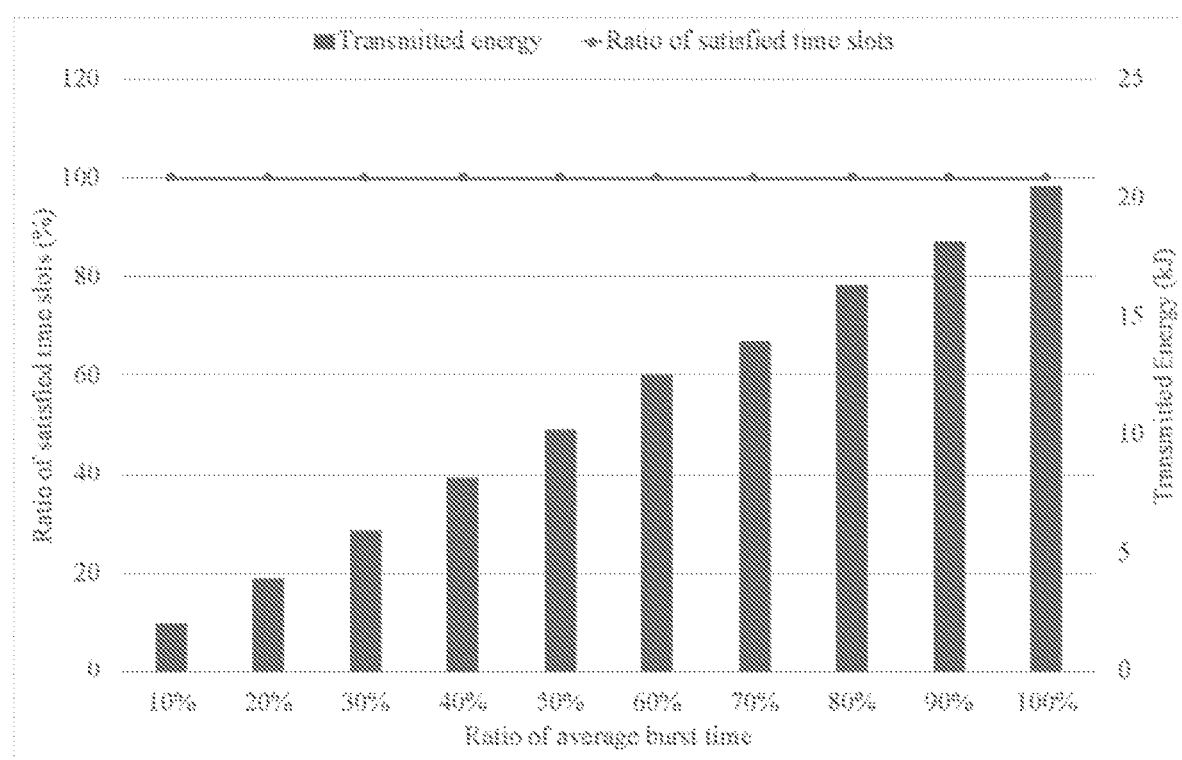
FIG. 17 is a graphical depiction of the ratio of satisfied time slots for the load and the total transmitted energy from the EPS to the load for different average burst times when the maximum current is set to 15 Amp in accordance with one or more embodiments disclosed herein.

Now referring to FIG. 17, depicted is the ratio of satisfied time slots for the load and the total transmitted energy from the EPS to the load for different average burst times when the maximum current is set to 15 Amp. The load satisfaction ratio is the ratio of time slots the load is ON and the total time it performs work, or the time the supercapacitors supplies energy. This ratio excludes the time slots when the load is ON but the capacitors have no energy for it, leading the load (here, the motor) to be idle. These time slots are referred to herein as unsatisfied time slots. The curve representing the ratio of satisfied time slots shows that when the maximum permissible current is 15 Amp, the satisfaction ratio is 100% for all burst sizes. This result means that the load demands a total amount of energy that is less than or equal to the EPS capacity for this maximum current and at all times. The vertical bars show the total amount of transmitted energy from the EPS during the duration of the experiment, which is the energy spent by the load. These bars indicate the actual energy consumed by the load, as supplied. The maximum total transmitted energy is about 20 kJ for an ON state during 100% of the time or a load performing 100% work.

Figure 18:
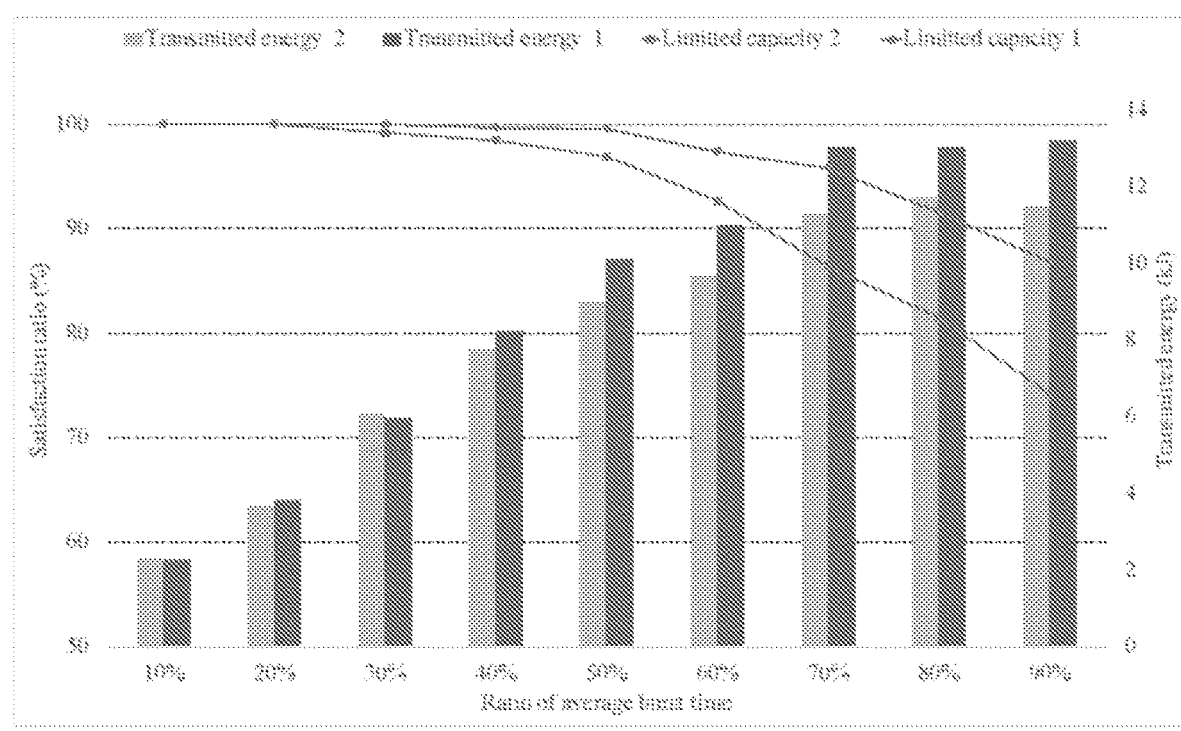
FIG. 18 is a graphical depiction of the satisfaction ratio and total transmitted energy of different average burst time for maximum permissible currents in accordance with one or more embodiments disclosed herein.

The rate at which energy is transmitted from the EPS to a load depends on the maximum amount of current permitted to flow, set by the RC constant of the circuit towards the supercapacitor. In view of this consideration, in this phase of the experiment the time to transfer energy was set in a time slot with a duration of 20 seconds. The cases for maximum current of 6 and 7.5 Amp were considered. With reference to FIG. 18, the outcomes of an experiment where the capacity of the EPS, in terms of energy that can be transferred, is limited. The currents were limited by using different small resistors (e.g., R1 to R4 in FIG. 13). The outcomes are the ratio of satisfied time slots of energy demanded by the load and the total amount of energy the EPS transmitted to the load for a different duty cycle, here defined as the ratio of average burst time over the duration of a cycle, and different maximum permissible currents. The lower curve (green line) shows the ratio of satisfied time slots when the current is 3.75 Amps. With the increase of the ratio of the average burst time, the ratio of satisfied time slots decreases from 100 to about 75%. The supercapacitors can handle high currents and charge/discharge at a fast rate. To leverage these properties of supercapacitors, a maximum current of 7.5 Amp was enabled. As the upper curve (orange line) shows, the ratio of satisfied time slots increases under these conditions. The vertical bars show the total transmitted energy in different scenarios—the left-hand bars (gray) represent 3.75 Amp and the right-hand bars (blue) represent 7.5 Amp. When the load is low energy-demanding (ratio of average burst time from 10 to 30%), the total transmitted energy increases with the increasing ratio of average burst time and with different resistors the total transmitted energy is almost the same. When the load is average-energy-demanding (ratio of average burst time from 40 to 60%), the total transmitted energy increases. However, the total transmitted energy, when using a maximum current of 7.5 Amp, is larger than 3.75 Amp because energy can be transmitted faster with 7.5 Amp, as expected. In addition, when the load is highly demanding (ratio of average burst time from 70 to 90%), the total transmitted energy by using 7.5 Amp is the largest. However, the total transmitted energy remains constant for these two scenarios because the capacity of the transmitted energy is limited. Even if the load requires more energy during a period of time, the total energy it receives is limited. This last feature shows that the EPS can limit the maximum amount of energy that can be transmitted to the load.

Delayed-Grant Scheme for Granting Issued Requests

As noted above, when the load demands large amounts of energy (e.g., large burst sizes), the ratio of satisfied time slots cannot remain at a high level for the least frequency transfer policy. This case is observable when the load (through the ON-OFF model) has large active bursts of work. For example, when the ratio of average burst time increases from 70 to 90%, the ratio of satisfied time slots decreases from 95 to about 85%. To achieve a higher performance, a delayed grant scheme is employed. A situation can arise in which for a time slot, the state of the load is ON and the supercapacitors have insufficient energy. During that time, the supercapacitors request and wait to receive enough energy to continue the load's work. Stalling the load (e.g. a DC motor) means that the ON-state time slot is unsatisfied. By using the delayed-grant scheme, the demanded ON-state time slot is queued so that a) the load receives the energy needed for performing work during that time slot in the future once the EPS has enough energy, and b) the load may not need to reissue the request for that energy, as the EPS would queue it.

Figure 19:
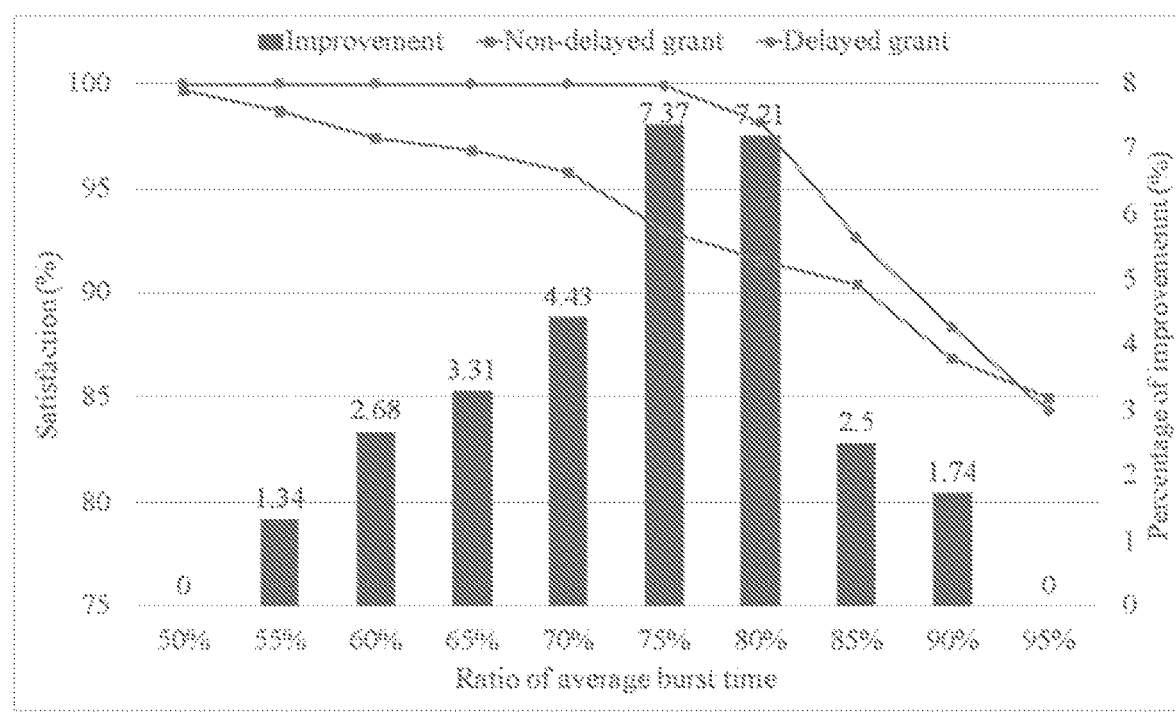
FIG. 19 is a graphical depiction of the difference between non-delayed grant and delayed grant schemes with load using least frequency transfer requesting policy, under a maximum current of 7.5 Amp in accordance with one or more embodiments disclosed herein.

Now referring to FIG. 19, a comparison is depicted between the non-delayed and delayed grant schemes when the load demands large amounts of energy. The upper (orange) curve shows the ratio of satisfied time slots and the vertical (blue) bars show the improvement by using the delayed grant scheme. For example, when the ratio of the average burst time is 75%, the ratio of satisfied time slots increases from 93 to about 100%. The reason for this improvement is that the non-delayed grant scheme loses requests and that leaves small amounts of energy in the user for the load to work. On the other hand, the delayed-grant scheme allows the user to request all the energy the load demands so that the load supercapacitors receive the energy, even if the load goes off while waiting for the energy. However, in such a case, the energy is stored until the load goes ON, letting the user have more energy available.

Figure 20:
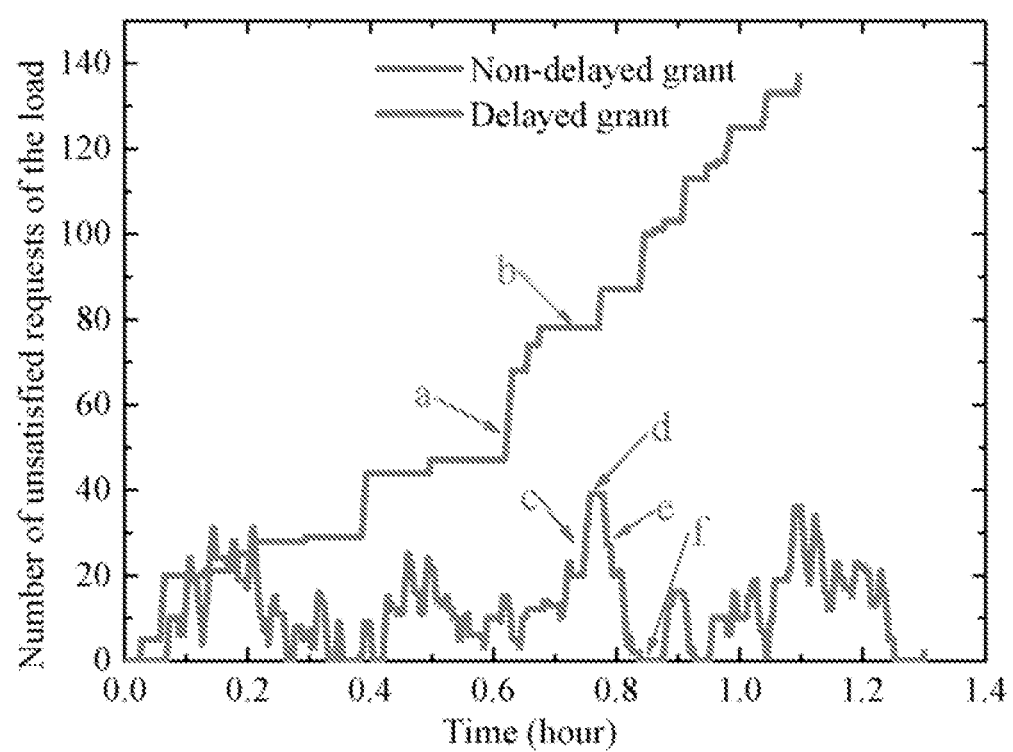
FIG. 20 is a graphical depiction of a comparison of a number of unsatisfied time slots between non-delayed grant and delayed grant schemes in accordance with one or more embodiments disclosed herein.

To show the impact of the delayed grant scheme on the number of unsatisfied energy requests, a load was considered in the ON state with 75% average burst time, as an example, and compared the non-delayed grant scheme to that of the delayed grant scheme. With reference to FIG. 20, depicted is the number of unsatisfied requests of the load as a function of time. The upper curve (orange) shows the cumulative number of unsatisfied time slots of the non-delayed grant scheme, and that the number of unsatisfied time slots increases over time as the load is stalled. This is due in part to the least frequency transfer policy used by the supercapacitors as non-satisfied time slots that issue request are ignored. The lower (green line) shows the number of unsatisfied time slots under the delayed grant scheme over the same time period. This curve shows that the number of unsatisfied time slots remains at a low level because the supercapacitor eventually receives the requested energy and those requests are not ignored when the load goes OFF. In FIG. 20, at point "a", the load is ON during this time but there is no energy available to let the load do the work. At point "b", the supercapacitors can provide energy to the load, independent of the load state. At point "c", similar to point "a", the load is ON but there is no energy available at the supercapacitors. At point "d", the load is ON and there is energy available for the load or the load is OFF and there is no energy available. At point "e", the load is OFF and there is energy available as grants are received. Therefore, during this period of time, the number of unsatisfied time slots decreases. At point "f", the load is in either state and there is energy available.

In the delayed grant scheme, each unsatisfied time slot saved in the queue waits for some time to be granted. The average waiting time is defined as:

$$t = \sum_{i=1}^{m} \frac{t_i}{N_{ON}}$$

where $t_i$ is the waiting time of the i-th unsatisfied time slot, m is the total number of queued unsatisfied time slots in the queue, and $N_{ON}$ is the total number of ON states during the whole time of the experiment. Using the burst time of 75% as an example, in the experimental conditions, the average waiting time of the unsatisfied time slots is 33.13 time slots. Each time slot is 2 s. Therefore, the average waiting time for the unsatisfied time slots to be granted is 66.26 s.

Figure 21:
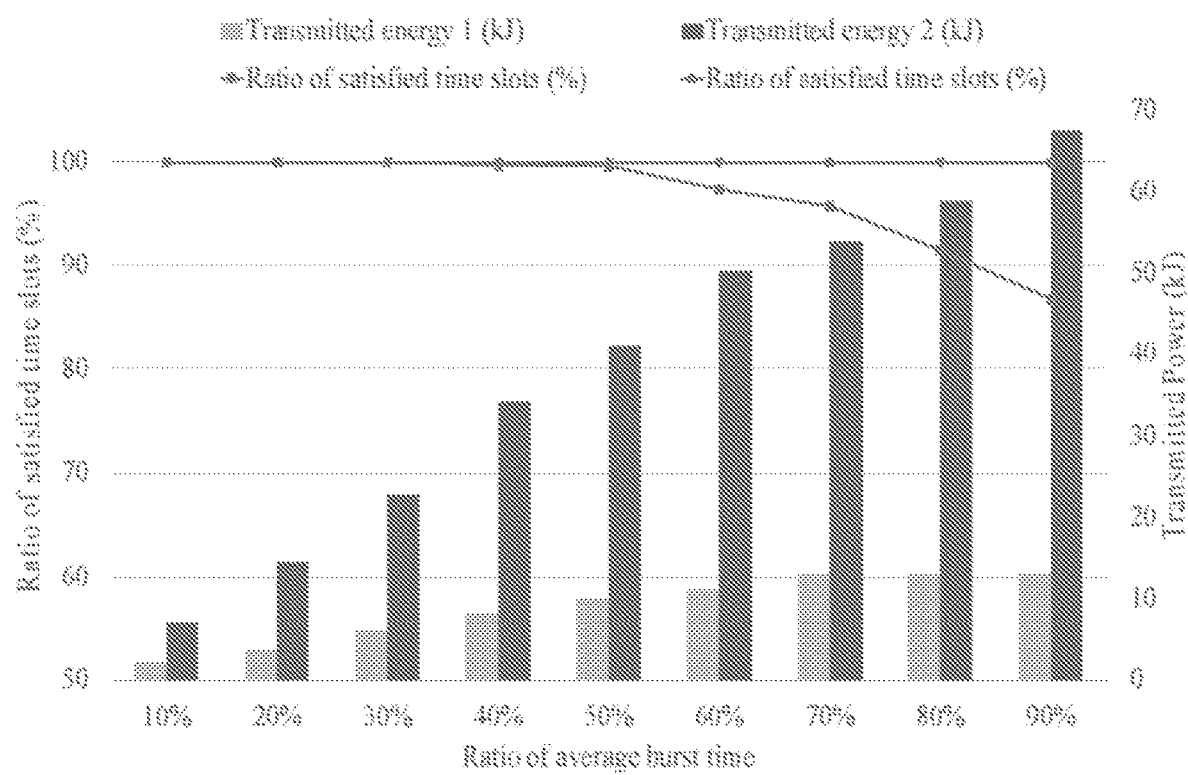
FIG. 21 is a graphical depiction of a comparison of satisfaction ratios between top-off and latest-refill schemes using non-delayed grants in accordance with one or more embodiments disclosed herein.

Now referring to FIG. 21, depicted is the power consumption of an EPS testbed where C1 uses a) least frequency transfer and b) top-off recharging policies used on C1. A load and EPS use these policies to keep their respective supercapacitors charged. The upper curve (orange) represents the top-off policy, and shows C1 remains 100% charged for most of the simulation time. The lower curve (green) represents the least frequent transfer policy, and indicates a decrease on the satisfaction ratio experienced by the load after an average burst of 50% of time. This phenomenon occurs because the load work outlasts the amount of available energy in C1 and C1 only requests energy when the supercapacitor reaches the smallest threshold, which is equivalent to a request for energy when the capacitor is almost empty. Therefore, C1 has no time to recharge to sustain a load performing work for bursts lasting 50% or more of a time cycle.

Different policies can be used to request energy, or recharge, of the load supercapacitors. Thus, higher satisfaction ratios of the load are achieved by using larger permissible currents to transfer energy between supercapacitors. Large currents increase the speed of charging/discharging of the supercapacitors. In addition, the total energy that can be transferred from the EPS to the user is also limited even when the load demands large amounts of energy. This property prevents the EPS from experiencing an occurrence of a failure or blackout, showing the robustness of the transmission of energy in controllable amounts and in demand.

Moreover, a delayed grant scheme exercised by the EPS (used as an energy dispatcher) achieves higher performance when used in combination with the least frequent transfer as a supercapacitor recharging policy. The delayed grant scheme keeps the number of unsatisfied time slots small and it improves the ratio of satisfied time slots by 7.37%. In addition, the top-off recharging policy can sustain longer periods of load work. In fact, with the use of the top-off policy, the application of delayed grants may be reduced or averted.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

REFERENCES

All references are hereby incorporated by reference in their entireties.

[1] H. Saitoh and J. Toyoda, "A new concept of electric power network for the effective transportation of small power of dispersed generation plants," IEEJ Transactions on Power and Energy, vol. 115, no. 6, pp. 568-575, 1995.
[2] R. Abe, H. Taoka, and D. McQuilkin, "Digital grid: Communicative electrical grids of the future," IEEE Transactions on Smart Grid, vol. 2, no. 2, pp. 399-410, 2011.
[3] Y. Xu, R. Rojas-Cessa, and H. Grebel, "Allocation of discrete energy on a cloud-computing datacenter using a digital power grid," in 2012 IEEE International Conference on Green Computing and Communications. IEEE, 2012, pp. 615-618.
[4] R. Rojas-Cessa, Y. Xu, and H. Grebel, "Management of a smart grid with controlled-delivery of discrete levels of energy," in 2013 IEEE Electrical Power & Energy Conference. IEEE, 2013, pp. 1-6.
[5] R. Rojas-Cessa, V. Sahasrabudhe, E. Miglio, D. Balineni, J. Kurylo, and H. Grebel, "Testbed evaluations of a controlled-delivery power grid," in 2014 IEEE International Conference on Smart Grid Communications (SmartGridComm). IEEE, 2014, pp. 206-211.
[6] Z. Jiang, H. Shah, R. Rojas-Cessa, H. Grebel, and A. Mohamed, "Experimental evaluation of power distribution to reactive loads in a network controlled delivery grid," in 2018 Third International Conference on Fog and Mobile Edge Computing (FMEC). IEEE, 2018, pp. 199-204.
[7] R. Gono, S. Rusek, and M. Kratky, "Reliability analysis of distribution networks," in 2007 9th International Conference on Electrical Power Quality and Utilisation. IEEE, 2007, pp. 1-5.
[8] H. He, "Toward a smart grid: Integration of computational intelligence into power grid," in The 2010 International Joint Conference on Neural Networks (IJCNN). IEEE, 2010, pp. 1-6.
[9] S. Galli, A. Scaglione, and Z. Wang, "For the grid and through the grid: The role of power line communications in the smart grid," Proceedings of the IEEE, vol. 99, no. 6, pp. 998-1027, 2011.
[10] W. E. Liu, K. Liu, and D. Pearson, "Consumer-centric smart grid," in ISGT 2011. IEEE, 2011, pp. 1-6.
[11] K. Budka, J. Deshpande, J. Hobby, Y.-J. Kim, V. Kolesnikov, W. Lee, T. Reddington, M. Thottan, C. A. White, J.-I. Choi et al., "Geri-bell labs smart grid research focus: economic modeling, networking, and security & privacy," in 2010 First IEEE International Conference on Smart Grid Communications. IEEE, 2010, pp. 208-213.
[12] G. Lu, D. De, and W.-Z. Song, "Smartgridlab: A laboratory-based smart grid testbed," in 2010 First IEEE International Conference on Smart Grid Communications. IEEE, 2010, pp. 143-148.
[13] W.-Y. Yu, V.-W. Soo, M.-S. Tsai, and Y.-B. Peng, "Coordinating a society of switch agents for power distribution service restoration in a smart grid," in 2011 16th International Conference on Intelligent System Applications to Power Systems. IEEE, 2011, pp. 1-7.
[14] F. Bouhafs, M. Mackay, and M. Merabti, "Links to the future: Communication requirements and challenges in the smart grid," IEEE Power and Energy Magazine, vol. 10, no. 1, pp. 24-32, 2012.
[15] Z. Fan, P. Kulkarni, S. Gormus, C. Efthymiou, G. Kalogridis, M. Sooriyabandara, Z. Zhu, S. Lambotharan, and W. H. Chin, "Smart grid communications: Overview of research challenges, solutions, and standardization activities," IEEE Communications Surveys & Tutorials, vol. 15, no. 1, pp. 21-38, 2013.
[16] T. Takuno, M. Koyama, and T. Hikihara, "In-home power distribution systems by circuit switching and power packet dispatching," in 2010 First IEEE International Conference on Smart Grid Communications. IEEE, 2010, pp. 427-430.
[17] M. M. He, E. M. Reutzel, X. Jiang, R. H. Katz, S. R. Sanders, D. E. Culler, and K. Lutz, "An architecture for local energy generation, distribution, and sharing," in 2008 IEEE Energy 2030 Conference. IEEE, 2008, pp. 1-6.
[18] M. Alizadeh, A. Scaglione, and R. J. Thomas, "From packet to power switching: Digital direct load scheduling," IEEE Journal on Selected Areas in Communications, vol. 30, no. 6, pp. 1027-1036, 2012.
[19] R. Rojas-Cessa, C.-K. Wong, Z. Jiang, H. Shah, H. Grebel, and A. Mohamed, "An energy packet switch for digital power grids," arXiv preprint arXiv:1809.08274, 2018.

What is claimed is:

1. A method of delivering energy to a user in a system the method comprising:

initializing voltages of at least one EPS supercapacitor of at least one energy packet switch (EPS), the at least one EPS comprising: a central controller, at least one energy inlet, at least one energy outlet, a network interface, the at least one EPS supercapacitor, and an interconnection fabric, wherein the interconnection fabric comprises a plurality of network controllable switches, coupled to the at least one EPS supercapacitor and the central controller to Vs0 by at least one energy source of the system, the system comprising:
the at least one energy source coupled to the at least one EPS via the at least one energy inlet, and the user, the user comprising at least one user supercapacitor, wherein the at least one user supercapacitor is operably coupled to the at least one EPS via the at least one network interface and the at least one energy interface, wherein the at least one EPS communicates with the at least one user supercapacitor and the at least one energy source through a data network, receiving at the at least one EPS a request for energy from the at least one user supercapacitor, the request comprising an IP address and target voltage V1 of the at least one user supercapacitor, calculating at the at least one EPS a number of supercapacitors, k, required to charge the at least one user supercapacitor, assigning a required number of supercapacitors, k, to the at least one user, determining whether there are k or more supercapacitors available in the at least one EPS, and if so, assigning k supercapacitors to the at least one user in a next time slot in a queue, issuing an energy grant to the at least one user via the data network, and recharging by the energy source the k supercapacitors to a maximum voltage.

2. The method of claim 1 wherein the at least one user supercapacitor sends a request for energy to the at least one EPS when the voltage of the at least one user supercapacitor is below a threshold tL.

3. The method of claim 1 wherein the at least one EPS calculates the number of supercapacitors, k, required to charge the at least one user supercapacitor according to the formula $$kCs(V_{s0}-V_s)=Cl(V_f-V_{l0}) \quad (2)$$

where Vl and Vl0 are the voltage of the at least one user supercapacitor before and after receiving the charge, and Cl is the capacitance of the at least one user supercapacitor.

4. The method of claim 1 wherein the at least one EPS calculates the amount of energy transferred between the at least one EPS supercapacitor and the at least one user supercapacitors according to the formula $$E_{sf}=\tfrac{1}{2}Cl(V_l^2-V_{l0}^2) \quad (3).$$

5. The method of claim 1, wherein when the user comprises plural user supercapacitors, when the consuming load is consuming energy, one of the plural user supercapacitors supplies energy to the consuming load and another of the plural user supercapacitors recharges.

6. The method of claim 5, wherein the at least one EPS recharges the other of the plural user supercapacitors according to a least frequency transfer policy wherein the other of the plural user supercapacitors issues a request for energy to the EPS when Vl<tL for an amount of energy that can be stored in a time slot.

7. The method of claim 6 wherein the amount of energy depends on the duration of the time slot and the maximum permissible current.

8. The method of claim 5 wherein the at least one EPS recharges the other of the plural user supercapacitors according to a top-off policy wherein the other of the plural user supercapacitors issues a request for energy to the at least one EPS when voltage of the other of the plural user supercapacitors dips below a predefined value.

* * * * *